(12) United States Patent
Snyder et al.

(10) Patent No.: US 10,680,277 B2
(45) Date of Patent: Jun. 9, 2020

(54) RECHARGEABLE, HIGH-DENSITY ELECTROCHEMICAL DEVICE

(71) Applicant: Sapurast Research LLC, Wilmington, DE (US)

(72) Inventors: Shawn W. Snyder, Santa Clara, CA (US); Bernd J. Neudecker, Los Gatos, CA (US)

(73) Assignee: Sapurast Research LLC, Wilmington, DE (US)

( * ) Notice: Subject to any disclaimer, the term of this patent is extended or adjusted under 35 U.S.C. 154(b) by 228 days.

(21) Appl. No.: 15/819,172

(22) Filed: Nov. 21, 2017

(65) Prior Publication Data

US 2018/0097252 A1    Apr. 5, 2018

Related U.S. Application Data

(63) Continuation of application No. 13/154,980, filed on Jun. 7, 2011, now abandoned.

(60) Provisional application No. 61/352,082, filed on Jun. 7, 2010.

(51) Int. Cl.
| | |
|---|---|
| *H01M 10/052* | (2010.01) |
| *H01M 4/485* | (2010.01) |
| *H01M 4/62* | (2006.01) |
| *H01M 4/66* | (2006.01) |
| *H01M 10/0562* | (2010.01) |

(52) U.S. Cl.
CPC ......... *H01M 10/052* (2013.01); *H01M 4/485* (2013.01); *H01M 4/624* (2013.01); *H01M 4/665* (2013.01); *H01M 10/0562* (2013.01)

(58) Field of Classification Search
CPC .......... H01M 10/052; H01M 10/0562; H01M 4/485; H01M 4/624; H01M 4/665
See application file for complete search history.

(56) References Cited

U.S. PATENT DOCUMENTS

| | | |
|---|---|---|
| 712,316 A | 10/1902 | Loppe et al. |
| 3,309,302 A | 3/1967 | Heil |
| 3,616,403 A | 10/1971 | Collins et al. |

(Continued)

FOREIGN PATENT DOCUMENTS

| | | |
|---|---|---|
| CN | 1415124 A | 4/2003 |
| CN | 1532984 A | 9/2004 |

(Continued)

OTHER PUBLICATIONS

Abraham, K.M. et al., "Inorganic-organic composite solid polymer electrolytes," 147(4) J. Electrochem. Soc. 1251-56 (2000).

(Continued)

*Primary Examiner* — Adam A Arciero
(74) *Attorney, Agent, or Firm* — Young Basile Hanlon & MacFarlane, P.C.

(57) ABSTRACT

Rechargeable, high-density electrochemical devices are disclosed. These electrochemical devices may, for example, include high energy densities that store more energy in a given, limited volume than other batteries and still show acceptable power or current rate capability without any liquid or gel-type battery components. Certain embodiments may involve, for example, low volume or mass of all of the battery components other than the cathode, while simultaneously achieving high electrochemically active mass inside the positive cathode.

20 Claims, 3 Drawing Sheets

(56) References Cited

U.S. PATENT DOCUMENTS

| | | |
|---|---|---|
| 3,790,432 A | 2/1974 | Fletcher et al. |
| 3,797,091 A | 3/1974 | Gavin |
| 3,850,604 A | 11/1974 | Klein |
| 3,939,008 A | 2/1976 | Longo et al. |
| 4,082,569 A | 4/1978 | Evans, Jr. |
| 4,111,523 A | 9/1978 | Kaminow et al. |
| 4,127,424 A | 11/1978 | Ullery, Jr. |
| 4,226,924 A | 10/1980 | Kimura et al. |
| 4,283,216 A | 8/1981 | Brereton |
| 4,318,938 A | 3/1982 | Barnett et al. |
| 4,328,297 A | 5/1982 | Bilhorn |
| 4,395,713 A | 7/1983 | Nelson et al. |
| 4,437,966 A | 3/1984 | Hope et al. |
| 4,442,144 A | 4/1984 | Pipkin |
| 4,467,236 A | 8/1984 | Kolm et al. |
| 4,481,265 A | 11/1984 | Ezawa et al. |
| 4,518,661 A | 5/1985 | Rippere |
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen et al. |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Amtz et al. |
| 5,173,271 A | 12/1992 | Chen et al. |
| 5,174,876 A | 12/1992 | Buchal et al. |
| 5,180,645 A | 1/1993 | More |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,262,254 A | 11/1993 | Koksbang et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,302,474 A | 4/1994 | Shackle |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstem et al. |
| 5,338,625 A | 8/1994 | Bates et al. |
| 5,342,709 A | 8/1994 | Yahnke et al. |
| 5,355,089 A | 10/1994 | Treger |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Thaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Jou et al. |
| 5,458,995 A | 10/1995 | Behl et al. |
| 5,464,692 A | 11/1995 | Huber |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Mild et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates |
| 5,612,153 A | 3/1997 | Moulton et al. |
| 5,613,995 A | 3/1997 | Bhandarkar et al. |
| 5,616,933 A | 4/1997 | Li |
| 5,618,382 A | 4/1997 | Mintz et al. |
| 5,625,202 A | 4/1997 | Chai |
| 5,637,418 A | 6/1997 | Brown et al. |
| 5,643,480 A | 7/1997 | Gustavsson et al. |
| 5,644,207 A | 7/1997 | Lew et al. |

(56) References Cited

U.S. PATENT DOCUMENTS

| | | |
|---|---|---|
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Barley |
| 5,677,784 A | 10/1997 | Harris |
| 5,679,980 A | 10/1997 | Summerfelt |
| 5,681,666 A | 10/1997 | Treger et al. |
| 5,686,360 A | 11/1997 | Harvey, III et al. |
| 5,689,522 A | 11/1997 | Beach |
| 5,693,956 A | 12/1997 | Shi et al. |
| 5,702,829 A | 12/1997 | Paidassi et al. |
| 5,705,293 A | 1/1998 | Hobson |
| 5,716,728 A | 2/1998 | Smesko et al. |
| 5,718,813 A | 2/1998 | Drummond et al. |
| 5,719,976 A | 2/1998 | Henry et al. |
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsman |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Van Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Fleming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,033,768 A | 3/2000 | Muenz et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,046,514 A | 4/2000 | Rouillard et al. |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz de Araujo et al. |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,156,452 A | 12/2000 | Kozuki et al. |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,128 B1 | 6/2001 | Tura et al. |

(56) References Cited

U.S. PATENT DOCUMENTS

| | | |
|---|---|---|
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,111 B1 * | 7/2001 | Bito ............ H01M 4/13 429/218.1 |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata et al. |
| 6,280,875 B1 | 8/2001 | Kwak et al. |
| 6,281,142 B1 | 8/2001 | Basceri et al. |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin et al. |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomii et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greef et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greef et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |
| 6,444,750 B1 | 9/2002 | Touhsaent |
| 6,459,418 B1 | 10/2002 | Comiskey et al. |
| 6,459,726 B1 | 10/2002 | Ovard et al. |
| 6,466,771 B2 | 10/2002 | Wood, Jr. |
| 6,475,668 B1 | 11/2002 | Hosokawa et al. |
| 6,480,699 B1 | 11/2002 | Lovoi |
| 6,481,623 B1 | 11/2002 | Grant et al. |
| 6,485,622 B1 | 11/2002 | Fu |
| 6,488,822 B1 | 12/2002 | Moslehi |
| 6,494,999 B1 | 12/2002 | Herrera et al. |
| 6,495,283 B1 | 12/2002 | Yoon et al. |
| 6,497,598 B2 | 12/2002 | Affinito |
| 6,500,287 B1 | 12/2002 | Azens et al. |
| 6,503,661 B1 | 1/2003 | Park et al. |
| 6,503,831 B2 | 1/2003 | Speakman |
| 6,506,289 B2 | 1/2003 | Demaray et al. |
| 6,511,516 B1 | 1/2003 | Johnson et al. |
| 6,511,615 B1 | 1/2003 | Dawes et al. |
| 6,517,968 B2 | 2/2003 | Johnson et al. |
| 6,522,067 B1 | 2/2003 | Graff et al. |
| 6,524,466 B1 | 2/2003 | Bonaventura et al. |
| 6,524,750 B1 | 2/2003 | Mansuetto |
| 6,525,976 B1 | 2/2003 | Johnson |
| 6,528,212 B1 | 3/2003 | Kusumoto et al. |
| 6,529,827 B1 | 3/2003 | Beason et al. |
| 6,533,907 B2 | 3/2003 | Demaray et al. |
| 6,537,428 B1 | 3/2003 | Xiong et al. |
| 6,538,211 B2 | 3/2003 | St. Lawrence et al. |
| 6,541,147 B1 | 4/2003 | McLean et al. |
| 6,548,912 B1 | 4/2003 | Graff et al. |
| 6,551,745 B2 | 4/2003 | Moutsios et al. |
| 6,558,836 B1 | 5/2003 | Whitacre et al. |
| 6,562,513 B1 | 5/2003 | Takeuchi et al. |
| 6,563,998 B1 | 5/2003 | Farah et al. |
| 6,569,564 B1 | 5/2003 | Lane |
| 6,569,570 B2 | 5/2003 | Sonobe et al. |
| 6,570,325 B2 | 5/2003 | Graff et al. |
| 6,572,173 B2 | 6/2003 | Muller |
| 6,573,652 B1 | 6/2003 | Graff et al. |
| 6,576,546 B2 | 6/2003 | Gilbert et al. |
| 6,579,728 B2 | 6/2003 | Grant et al. |
| 6,582,480 B2 | 6/2003 | Pasquier et al. |
| 6,582,481 B1 | 6/2003 | Erbil |
| 6,582,852 B1 | 6/2003 | Gao et al. |
| 6,589,299 B2 | 7/2003 | Missling et al. |
| 6,593,150 B2 | 7/2003 | Ramberg et al. |
| 6,599,662 B1 | 7/2003 | Chiang et al. |
| 6,600,905 B2 | 7/2003 | Greeff et al. |
| 6,602,338 B2 | 8/2003 | Chen et al. |
| 6,603,139 B1 | 8/2003 | Tessler et al. |
| 6,603,391 B1 | 8/2003 | Greeff et al. |
| 6,605,228 B1 | 8/2003 | Kawaguchi et al. |
| 6,608,464 B1 | 8/2003 | Lew et al. |
| 6,608,470 B1 | 8/2003 | Oglesbee et al. |
| 6,610,440 B1 | 8/2003 | LaFollette et al. |
| 6,615,614 B1 | 9/2003 | Makikawa et al. |

(56) References Cited

U.S. PATENT DOCUMENTS

| | | |
|---|---|---|
| 6,616,035 B2 | 9/2003 | Ehrensvard et al. |
| 6,618,829 B2 | 9/2003 | Pax et al. |
| 6,620,545 B2 | 9/2003 | Goenka et al. |
| 6,622,049 B2 | 9/2003 | Penner et al. |
| 6,632,563 B1 | 10/2003 | Krasnov et al. |
| 6,637,906 B2 | 10/2003 | Knoerzer et al. |
| 6,637,916 B2 | 10/2003 | Mullner |
| 6,639,578 B1 | 10/2003 | Comiskey et al. |
| 6,642,895 B2 | 11/2003 | Zurcher et al. |
| 6,645,675 B1 | 11/2003 | Munshi |
| 6,650,000 B2 | 11/2003 | Ballantine et al. |
| 6,650,942 B2 | 11/2003 | Howard et al. |
| 6,662,430 B2 | 12/2003 | Brady et al. |
| 6,664,006 B1 | 12/2003 | Munshi |
| 6,673,484 B2 | 1/2004 | Matsuura |
| 6,673,716 B1 | 1/2004 | D'Couto et al. |
| 6,674,159 B1 | 1/2004 | Peterson et al. |
| 6,677,070 B2 | 1/2004 | Kearl |
| 6,683,244 B2 | 1/2004 | Fujimori et al. |
| 6,683,749 B2 | 1/2004 | Daby et al. |
| 6,686,096 B1 | 2/2004 | Chung |
| 6,693,840 B2 | 2/2004 | Shimada et al. |
| 6,700,491 B2 | 3/2004 | Shafer |
| 6,706,449 B2 | 3/2004 | Mikhaylik et al. |
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jenson et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jenson |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Furst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,648,537 B2 | 1/2010 | Harada et al. |
| 7,670,724 B1 | 3/2010 | Chan et al. |
| 7,848,715 B2 | 12/2010 | Boos |
| 7,858,223 B2 | 12/2010 | Visco et al. |
| 7,998,622 B2 | 8/2011 | Inda |
| 8,010,048 B2 | 8/2011 | Brommer et al. |
| 8,056,814 B2 | 11/2011 | Martin et al. |
| 8,293,389 B2 | 10/2012 | Tsuchida |
| 2001/0005561 A1 | 6/2001 | Yamada et al. |
| 2001/0016290 A1 | 8/2001 | Kezuka |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Thu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |

(56) References Cited

U.S. PATENT DOCUMENTS

| | | |
|---|---|---|
| 2002/0000034 A1 | 1/2002 | Jenson |
| 2002/0001746 A1 | 1/2002 | Jenson |
| 2002/0001747 A1 | 1/2002 | Jenson et al. |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0124386 A1 | 9/2002 | Hosoya et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 | 2/2003 | Zurcher et al. |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0054252 A1 | 3/2003 | Kusumoto et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0058237 A1 | 3/2004 | Higuchi et al. |
| 2004/0072067 A1 | 4/2004 | Minami et al. |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji et al. |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0107239 A1 | 5/2005 | Akiba et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0155545 A1 | 7/2006 | Jayne |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |

(56) References Cited

U.S. PATENT DOCUMENTS

| | | |
|---|---|---|
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0222681 A1 | 9/2007 | Greene et al. |
| 2007/0224951 A1 | 9/2007 | Gilb et al. |
| 2007/0229228 A1 | 10/2007 | Yamazaki et al. |
| 2007/0235320 A1 | 10/2007 | White et al. |
| 2007/0259270 A1 | 11/2007 | Inda et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |
| 2008/0003496 A1 | 1/2008 | Neudecker et al. |
| 2008/0008936 A1 | 1/2008 | Mizuta et al. |
| 2008/0014501 A1 | 1/2008 | Skotheim et al. |
| 2008/0057397 A1 | 3/2008 | Skotheim et al. |
| 2008/0150829 A1 | 6/2008 | Lin et al. |
| 2008/0213672 A1 | 9/2008 | Skotheim et al. |
| 2008/0233708 A1 | 9/2008 | Hisamatsu |
| 2008/0254575 A1 | 10/2008 | Fuergut et al. |
| 2008/0261107 A1 | 10/2008 | Snyder et al. |
| 2008/0263855 A1 | 10/2008 | Li et al. |
| 2008/0286651 A1 | 11/2008 | Neudecker et al. |
| 2009/0068563 A1 | 3/2009 | Kanda et al. |
| 2009/0081554 A1 | 3/2009 | Takada et al. |
| 2009/0092903 A1* | 4/2009 | Johnson ............ H01M 4/0471 429/322 |
| 2009/0124201 A1 | 5/2009 | Meskens |
| 2009/0181303 A1 | 7/2009 | Neudecker et al. |
| 2009/0197172 A1 | 8/2009 | Inda |
| 2009/0197281 A1 | 8/2009 | Fremont et al. |
| 2009/0202903 A1* | 8/2009 | Chiang ............ H01M 4/0426 429/203 |
| 2009/0274832 A1 | 11/2009 | Inda |
| 2009/0302226 A1 | 12/2009 | Schieber et al. |
| 2009/0308936 A1 | 12/2009 | Nitzan et al. |
| 2009/0312069 A1 | 12/2009 | Peng et al. |
| 2010/0001079 A1 | 1/2010 | Martin et al. |
| 2010/0032001 A1 | 2/2010 | Brantner |
| 2010/0086853 A1 | 4/2010 | Venkatachalam et al. |
| 2010/0112456 A1 | 5/2010 | Kimura et al. |
| 2010/0273056 A1 | 10/2010 | Kanda et al. |
| 2010/0285341 A1 | 11/2010 | Yun et al. |
| 2011/0129723 A1 | 6/2011 | Tsuchida |
| 2011/0212382 A1 | 9/2011 | Randall et al. |
| 2011/0267235 A1 | 11/2011 | Brommer et al. |
| 2011/0304430 A1 | 12/2011 | Brommer et al. |
| 2013/0189562 A1 | 7/2013 | Dolle et al. |

FOREIGN PATENT DOCUMENTS

| | | |
|---|---|---|
| CN | 1918727 A | 2/2007 |
| CN | 101385164 A | 3/2009 |
| CN | 101401232 A | 4/2009 |
| CN | 101595590 A | 12/2009 |
| DE | 10 2005 014 427 A1 | 9/2006 |
| DE | 10 2006 054 309 A1 | 5/2008 |
| DE | 10 2008 016 665 A1 | 10/2008 |
| DE | 10 2007 030604 A1 | 1/2009 |
| EP | 0 510 883 A2 | 10/1992 |
| EP | 0 639 655 A1 | 2/1995 |
| EP | 0 652 308 A2 | 5/1995 |
| EP | 0 820 088 A2 | 1/1998 |
| EP | 0 867 985 A1 | 9/1998 |
| EP | 1 068 899 A1 | 1/2001 |
| EP | 1 092 689 A1 | 4/2001 |
| EP | 1 189 080 A2 | 3/2002 |
| EP | 1 713 024 A1 | 10/2006 |
| EP | 2131421 A1 | 12/2009 |
| EP | 2214248 A1 | 8/2010 |
| FR | 2806198 A1 | 9/2001 |
| FR | 2 861 218 A1 | 4/2005 |
| JE | 19824145 A1 | 12/1999 |
| JP | S55009305 A | 1/1980 |
| JP | S56076060 A | 6/1981 |
| JP | S56156675 A | 12/1981 |
| JP | S6068558 A | 4/1985 |
| JP | S61269072 A | 11/1986 |
| JP | S62267944 A | 11/1987 |
| JP | S63290922 A | 11/1988 |
| JP | 02054764 A | 1/1990 |
| JP | 02230662 A | 9/1990 |
| JP | H03036962 A | 2/1991 |
| JP | 04058456 A | 2/1992 |
| JP | 04072049 A | 3/1992 |
| JP | H06010127 A | 1/1994 |
| JP | H06100333 A | 4/1994 |
| JP | H7224379 A | 8/1995 |
| JP | H7233469 A | 9/1995 |
| JP | H08114408 A | 5/1996 |
| JP | H10026571 A | 1/1998 |
| JP | H10239187 A | 9/1998 |
| JP | 11-204088 | 7/1999 |
| JP | 2000-144435 A | 5/2000 |
| JP | 2000162234 A | 6/2000 |
| JP | 2000-188099 A | 7/2000 |
| JP | 2000-268867 A | 9/2000 |
| JP | 2000340257 A | 12/2000 |
| JP | 2001015162 A | 1/2001 |
| JP | 2001171812 A | 6/2001 |
| JP | 2001-259494 A | 9/2001 |
| JP | 2001-297764 A | 10/2001 |
| JP | 2001-328198 A | 11/2001 |
| JP | 2002026412 A | 1/2002 |
| JP | 2002140776 A | 5/2002 |
| JP | 2002-344115 A | 11/2002 |
| JP | 2003-17040 A | 1/2003 |
| JP | 2003-347045 A | 12/2003 |
| JP | 2004-071305 A | 3/2004 |
| JP | 2004-149849 A | 5/2004 |
| JP | 2004-158268 A | 6/2004 |
| JP | 2004213938 A | 7/2004 |
| JP | 2004-273436 A | 9/2004 |
| JP | 2005078985 A | 3/2005 |
| JP | 2005-256101 A | 9/2005 |
| JP | 2007107752 A | 4/2007 |
| JP | 2007094641 A1 | 8/2007 |
| JP | 2008091328 A | 4/2008 |
| JP | 2008103283 A | 5/2008 |
| JP | 2008270137 A | 11/2008 |
| JP | 2009176541 A | 8/2009 |
| JP | 2009193802 A | 8/2009 |
| JP | 201090003 A | 4/2010 |
| JP | 2013514308 A | 4/2013 |
| KR | 20020007881 A | 1/2002 |
| KR | 20020017790 A | 3/2002 |
| KR | 20020029813 A | 4/2002 |
| KR | 20020038917 A | 5/2002 |
| KR | 20030033913 A | 5/2003 |
| KR | 20030042288 A | 5/2003 |
| KR | 20030085252 A | 11/2003 |
| RU | 2241281 C2 | 11/2004 |
| WO | 1995013629 A1 | 5/1995 |
| WO | 1996023085 A1 | 8/1996 |
| WO | 1996023217 A1 | 8/1996 |
| WO | 1997027344 A1 | 7/1997 |
| WO | 1997035044 A1 | 9/1997 |
| WO | 1998047196 A1 | 10/1998 |
| WO | 1999043034 A1 | 8/1999 |
| WO | 1999057770 A1 | 11/1999 |
| WO | 2000021898 A1 | 4/2000 |
| WO | 2000022742 A2 | 4/2000 |
| WO | 2000028607 A1 | 5/2000 |
| WO | 2000036665 A1 | 6/2000 |
| WO | 2000060682 A1 | 10/2000 |
| WO | 2000060689 A1 | 10/2000 |
| WO | 2000062365 A1 | 10/2000 |
| WO | 2001001507 A1 | 1/2001 |

(56) References Cited

FOREIGN PATENT DOCUMENTS

| | | |
|---|---|---|
| WO | 2001017052 A2 | 3/2001 |
| WO | 2001024303 A1 | 4/2001 |
| WO | 2001033651 A1 | 5/2001 |
| WO | 2001039305 A1 | 5/2001 |
| WO | 2001073864 A2 | 10/2001 |
| WO | 2001073865 A2 | 10/2001 |
| WO | 2001073866 A2 | 10/2001 |
| WO | 2001073868 A2 | 10/2001 |
| WO | 2001073870 A2 | 10/2001 |
| WO | 2001073883 A2 | 10/2001 |
| WO | 2001073957 A2 | 10/2001 |
| WO | 2001082390 A1 | 11/2001 |
| WO | 2002012932 A2 | 2/2002 |
| WO | 2002042516 A2 | 5/2002 |
| WO | 2002045187 A1 | 6/2002 |
| WO | 2002071506 A1 | 9/2002 |
| WO | 2002101857 A1 | 12/2002 |
| WO | 2003003485 A1 | 1/2003 |
| WO | 2003005477 A2 | 1/2003 |
| WO | 2003026039 A2 | 3/2003 |
| WO | 2003036670 A2 | 5/2003 |
| WO | 2003069714 A1 | 8/2003 |
| WO | 2003080325 A1 | 10/2003 |
| WO | 2003083166 A1 | 10/2003 |
| WO | 2004012283 A2 | 2/2004 |
| WO | 2004021532 A1 | 3/2004 |
| WO | 2004061887 A1 | 7/2004 |
| WO | 2004077519 A2 | 9/2004 |
| WO | 2004086550 A1 | 10/2004 |
| WO | 2004093223 A2 | 10/2004 |
| WO | 2004106581 A2 | 12/2004 |
| WO | 2004106582 A2 | 12/2004 |
| WO | 2005008828 A1 | 1/2005 |
| WO | 2005013394 A1 | 2/2005 |
| WO | 2005038957 A2 | 4/2005 |
| WO | 2005067645 A2 | 7/2005 |
| WO | 2005085138 A1 | 9/2005 |
| WO | 2005091405 A1 | 9/2005 |
| WO | 2006063308 A2 | 6/2006 |
| WO | 2006085307 A1 | 8/2006 |
| WO | 2007016781 A1 | 2/2007 |
| WO | 2007019855 A1 | 2/2007 |
| WO | 2007027535 A2 | 3/2007 |
| WO | 2007095604 A2 | 8/2007 |
| WO | 2007105869 A1 | 9/2007 |
| WO | 2008036731 A2 | 3/2008 |
| WO | 2008099656 A1 | 8/2008 |
| WO | 2009048263 A1 | 4/2009 |
| WO | 2009063747 A1 | 5/2009 |
| WO | 2011101603 A1 | 8/2011 |

OTHER PUBLICATIONS

Abrahams, I., "Li6Zr207, a new anion vacancy ccp based structure, determined by ab initio powder diffraction methods," 104 J. Solid State Chem. 397-403 (1993).

Affinito, J.D. et al., "PML/oxide/PML barrier layer performance differences arising from use of UV or electron beam polymerization of the PML layers," Thin Solid Films 308-309: 19-25 (1997).

Affinito, J.D. et al., "Polymer-oxide transparent barrier layers," Society of Vacuum Coaters, 39th Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Amatucci, G. et al., "Lithium scandium phosphate-based electrolytes for solid state lithium rechargeable nicrobatteries," 60 Solid State Ionics 357-65 (1993).

Anh et al., "Significant Suppression of Leakage Current in (Ba,Sr)TiO3 Thin Films by Ni or Mn Doping," J. Appl. Phys.,92(5): 2651-2654 (Sep. 2002).

Appetecchi, G.B. et al., "Composite polymer electrolytes with improved lithium metal electrode interfacial properties," 145(12) J. Electrochem. Soc. 4126-32 (1998).

Asghari, M. and Dawnay, E., "Asoct™—a manufacturing integrated optics technology," SPIE 3620: 252-262 (Jan. 1999).

Barbier, D. et al., "Amplifying four-wavelength combiner, based on erbium/ytterbium-doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Bates et al., "Thin-Fim Lithium Batteries" in New Trends in Electrochemical Technology: Energy Storage Systems for Electronics (T. Osaka & M. Datta eds. Gordon and Breach 2000).

Bates, J.B. et al., "Electrical properties of amorphous lithium electrolyte thin films," 53-56 Solid State Ionics 647-54 (1992).

Beach R.J., "Theory and optimization oflens ducts," Applied Optics 35(12): 2005-2015 (1996).

Belkind, A. et al., "Pulsed-DC Reactive Sputtering of Dielectrics: Pulsing Parameter Effects," 43rd Annual Technical Conference Proceedings (2000).

Belkind, A. et al., "Using pulsed direct current power for reactive sputtering of Al203," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (Ti02)-based gate insulators," IBM J. Res. Develop. 43(3): 383-392 (1999).

Chang, C.Y. and Sze, S.M. (eds.), in ULSI Technology, The McGraw-Hill Companies, Inc., New York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er-Al-codoped silicate planar light waveguide-type amplifier fabricated by radio-frequency sputtering," Optics Letters 25(4): 263-265 (2000).

Choy et al., "Eu-Doped Y203 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-emperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFTs fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," 22nd European Conference on Optical Communication, Osla, I.123-I.126 (1996).

Delmas, C. et al., "Des conducteurs ioniques pseudo-bidimensionnels Li8M06 (M=Zr, Sn), Li7L06 (L=Nb, Ta) et Li61n206 ," 14 Mat. Res. Bull. 619-25 (1979).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for Gr/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-TEk News, Products; http://www.etek-inc.corni, 10 pages (2003).

(56) References Cited

OTHER PUBLICATIONS

Flytzanis, C. et al., "Nonlinear optics in composite materials," in Progress in Optics XXIX, Elsevier Science Publishers B.V., pp. 323-425 (1991).
Frazao, 0. et al., "EDFA gain flattening using long-period fibre gratings based on the electric arc technique," Proc. London Comm. Symp. 2001, London, England, 3 pages (2001).
Fujii, M. et al., "1.54 pm photoluminescence of Er.'+ doped into Si02 films containing Si nanocrystals: evidence for energy transfer from Si nanocrystals for Er3+," Appl. Phys. Lett. 71(9): 1198-1200 (1997).
Garcia, C. et al., "Size dependence of lifetime and absorption cross section of Si nanocrystals embedded in SiO2," Appl. Phys. Lett. 82(10): 1595-1597 (2003).
Goossens, A. et al., "Sensitization of TiO2 with p-type semiconductor polymers," Chem. Phys. Lett 287: 148 (1998).
Greene, J.E. et al., "Morphological and electrical properties ofrf sputtered Y20rdoped ZrO2 thin films," J. Vac. Sd. Tech. 13(1): 72-75 (1976).
Han, H.-S. et al., "Optical gain at 1.54 µm in Erbium-doped Silicon nanoclusler sensitized waveguide," Appl. Phys. Lett, 79(27): 4568-4570 (2001).
Hayakawa, T. et al., "Enhanced fluorescence from Eu3+ owing to surface plasma oscillation of silver particles in glass," J. Non-Crystalline Solids 259: 16-22 (1999).
Hayakawa, T. et al., "Field enhancement effect of small Ag particles on the fluorescence from Eu3+-doped Si0 glass," App. Phys. Lett. 74(11): 1513-1515 (1999).
Hayfield, P.C.S., I Development of a New Material-Monolithic Ti407 Ebonix® Ceramic, Royal Society of Chemistry, Cambridge, Table of Contents, 4 pages (2002).
Hehlen, M.P. et al., "Spectroscopic properties of Er-'+_ and Yb_H_ doped soda-lime silicate and aluminosilicate glasses," Physical Review B 56(15): 9302-9318 (1997).
Hehlen, M.P. et al., "Uniform upconversion in high-concentration Er3+-doped soda lime silicate and aluminosilicate Masses," Optics Letters 22(11); 772-774 (1997).
Horst, F. et al., "Compact, tunable optical devices in silicon-oxynitride waveguide technology," Top. Meeting Integrated Photonics Res. '00, Quebec, Canada, p. IThFl, 3 pages (2000).
Howson, R.P., "The reactive sputtering of oxides and nitrides," Pure & Appl. Chem. 66(6): 1311-1318 (1994).
Hu, Y-W. et al., "Ionic conductivity oftithium phosphate-doped lithium orthosilicate," 11 Mat. Res. Bull. 1227-30 (1976).
Balanis, Constantine A., "Antenna Theory: Analysis and Design," 3rd Ed., pp. 817-820 (John Wiley & Sons, Inc. Publication, 2005).
Inaguma, Yoshiyuki, "High Ionic Conductivity in Lithium Lanthanum Titanate," Solid State Communications,vol. 86, No. 10, pp. 689-693 (1993).
Guy, D., "Novel Architecture of Composite Electrode for Optimization of Lithium Battery Performance," Journal of Power Sources 157, pp. 438-442 (2006).
Wolfenstine, J., "Electrical Conductivity and Charge Compensation in Ta Doped Li4Ti5012," Journal of Power Sources 180, pp. 582-585 (2008).
Balanis, Constantine A., "Antenna Theory: Analysis and Design," 3rd Ed., pp. 811-820 (2005).
Jones and Akridge, "A thin film solid state microbattery," Solid State Ionics 53-56 (1992), pp. 628-634.
Ramaswamy, R.V. et al., "Ion-Exchange Glass Waveguides: A Review," J. Lightwave Technology 6(6): 984-1002 (1988).
Roberts, S.W. et al., "The Photoluminescence of Erbium-doped Silicon Monoxide," University of Southampton, Department of Electronics and Computer Science Research Journal, 7 pages (1996).
Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).
Sanyo Vacuum Industries Co., Ltd. Products Inky, Ti02 ,(2003), 1 page, http://www.sanyovac.co.jp/Englishweb/products?ETi02.htm.

Sarro, P., "Silicon Carbide as a New Mems Technology," Sensors and Actuators 82, 210-218 (2000).
Schermer, R. et al., "Investigation of Mesa Dielectric Waveguides," Proceedings of the OSA Integrated Photonics Research Topical Meeting and Exhibit, Paper No. IWB3, 3 pages (2001).
Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).
Scholder, V. et al., "Uber Zirkonate, Hafuate und Thorate von Barium, Strontium, Lithium und Natrium," Zeitschrift ffu Anorganische und Allgemeine Chemie, Band 362, pp. 149-168 (1968).
Scholl, R., "Power Supplies for Pulsed Plasma Technologies: State-of-the-Art and Outlook," Advances Energy ndustries, Inc. 1-8 (1999).
Scholl, R., "Power Systems for Reactive Sputtering of Insulating Films," Advances Energy Industries, Inc., 1-8 (Aug. 2001).
Second International Symposium of Polymer Surface Modification: Relevance to Adhesion, Preliminary Program, 13 pages (1999).
Seventh International Conference on T102 Photocatalysis: Fundamentals & Applications, Toronto, Ontario, Canada, Final Program, 7 pages (Nov. 17-21, 2002).
Sewell, P. et al., "Rib Waveguide Spot-Size Transformers: Modal Properties," J Lightwave Technology 17(5):848-856 (1999).
Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).
Shin, J.C. et al. "Dielectric and Electrical Properties of Sputter Grown (Ba,Se)Ti03 Thin Films," J. Appl. Phys. 86 (1):506-513 (1999).
Shmulovich, J. et al., "Recent progress in Erbium-doped waveguide amplifiers," Bell Laboratories, pp. 35-37 (1999).
Slooff, L.H. et al., "Optical properties of Erbium-doped organic polydentate cage complexes," J. Appl. Phys. 83 (1):497-503 (1998).
Smith, R.E. et al., "Reduced Coupling Loss Using a Tapered-Rib Adiabatic-Following Fiber Coupler," IEEE Photonics Technology Lett. 8(8): 1052-1054 (1996).
Snoeks, E. et al., "Cooperative upconversion in erbium-implanted soda-lime silicate glass optical waveguides," J. Opt. Soc. Am. B 12(8): 1468-1474 (1995).
Stamer "Human-Powered Wearable Computing" 35(3&4) IBM Sys. J. 618-29 (1996)[1].
Strohhofer, C. and Polman, A. "Energy transfer to ErH in Ag ion-exchanged glass," FOM Institute for Atomic and Molecular Physics, 10 pages (2001).
Sugiyama, A. et al., "Gas Permeation Through the Pinholes of Plastic Film Laminated with Aluminum Foil," Vuoto XXVIII(I-2):51-54 (1999).
Tervonen, A. "Challenges and opportunities for integrated optics in optical networks," SPIE 3620:2-11 (1999).
Ting, C.Y. et al., "Study of planarized sputter-deposited SiO2" J. Vac. Sci Technol, 15(3): 1105-1112 (1978).
Tomaszewski, H. et al., "Yttria-stabilized zirconia thin films grown by reactive r.f. magnetron sputtering," Thin Solid Films 287: 104-109 (1996).
Triechel, 0. and Kirchhoff, V., "The influence of pulsed magnetron sputtering on topography and crystallinity of Ti02 films on glass," Surface and Coating Technology 123:268-272 (2000).
Tukamoto, H. and West, A.R., "Electronic Conductivity of LiCoOs and Its Enhancement by Magnesium Doping," J. Electrochem. Soc 144(9):3164-3168 (1997).
Van Dover, R.B., "Amorphous Lanthanide-Doped TiOx Dielectric Films," Appl. Phys. Lett. 74(20):3041-3043 (1999).
Viljanen, J. and Leppihalme, M., "Planar Optical Coupling Elements for Muttimode Fibers with Two-Step Ion Migration Process," Applied Physics 24(1):61-63 (1981).
Villegas, M.A. et al., "Optical spectroscopy of a soda lime glass exchanged with silver," Phys. Chem. Glasses 37 (6):248-253 (1996).
Lee, Jong min et. al., "Study on the LLT Solid Electrolyte Thin Film with LiPON Interlayer Intervening Between LLT and Electrodes," Journal of Power Sources 163:173-179 (2006).

(56) References Cited

OTHER PUBLICATIONS

Morimoto, Hideyuki et al., Preparation of High Lithium Ion Conductive Glass-ceramics Solid Electrolytes in the LiTi2 (PO4)3 System by the Mechanochemical Method and Their Application as Coating Materials of LiCoO2, Key Engineering Materials 388:77-80 (2009).
Kobayashi, Y. et al., "All-Solid-State Lithium Secondary Battery witwithCerarnic/Polvmer Composite Electrolyte," Solid State Ionics 1 52-153: 137-142 (2002).
Minami, Keiichi et al., "Characterization of Solid Electrolytes Prepared from Li2S—P2S5 Glass and Ionic Liquids," J. Electrochem. Soc. 157:A1296-1301 (2010).
Murugan, Ramaswamy et al., "Fast Lithium Conduction in Garnet-Type Li7La3Zr2O12," Angew. Chem. Int. Ed. 46:7778-7781 (2007).
Tatsumisago, Masahiro, "Glassy Materials Based on Li2S for All-Solid-State Lithium Secondary Battereis," Solid State Ionics 175:12-18 (2004).
Sakuda, Atsushi et al., "Modification of Interface Between LiCoO2 Electrode and Li2S—P2S5 Solid Electrolyte Using Li2O—SiO2 Glassy Layers," J. Electrochem. Soc. 156:A27-A32 (2009).
Hill, K et al,, "Large Area Deposition by Mid-Frequency AC Sputtering," Society of Vacuum Coaters, 41st Annual Tech. Conference Proceedings, 197-202 (1998).
Macak, Karol et al, "Ionized Sputter Deposition Using an Extremely High Plasma Desnity Pulsed Magentron Discharge," J. Vac. Sci. Technol. A 18(4):1533-37 (2000).
Von Rottkay, K. et al., "Influences of stoichiometry on electrochromic cerium-titanium oxide compounds," Presented at the 11th Int'l Conference of Solid State Ionics, Honolulu, Hawaii, Nov. 19, 1997, Published in Solid Stale Ionics 113-115:425-430, (1998).
Wang, B. et al., "Characterization of Thin-Film Rechargeable Lithium Batteries with Lithium Cobalt Oxide Cathodes," J. Electrochem Soc. 143:3203-13 (1996).
Westlinder, J. et al., "Simulation and Dielectric Characterization of Reactive de Magnetron Cosputtered (Ta2O5 ) 1-x (Ti02)x Thin Films," J Vac. Sci. Technol. B 20(3):855-861 (May/Jun. 2002).
Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).
Yanagawa, H. et al., "Index-and-Dimensional Taper and Its Application to Photonic Devices," J. Lightwave Technology 10(51:587-591 (1992).
Yoshikawa, K. et al., "Spray formed aluminum alloys for sputtering targets," Powder Metallurgy 43(3): 1 98-199 (2000).
Yu, X. et al.,"A stable thin-film lithium electrolyte: lithium phosphorus oxynitride," 144(2) J. Electrochem. Soc. 524-532 (1997).
Zhang, H. et al., "High Dielectric Strength, High k TiO2 Films by Pulsed DC, Reactive Sputter Deposition," 5 pages (2001).
Dobkin, D.M., "Silicon Dioxide: Properties and Applications".
Nakano, Hiroyuki et al., Three-Dimensionally Ordered Composite Electrode Between LiMn2O4 and Li1.5 (PO4)3, resented at the Itth EurpConference on the Science and Technolgoy of Ionics 14:173-177 (2008).
Kotubuki, Masashi et al., "Compatibility of Li7La3Zr2O12 Solid Electrolyte to All-Solid-State Battery Using Li Metal Mode," J. Electrochem. Soc. 157:A1076-A1079 (2010).
Hubner, J. and Guldberg-Kjaer, S., "Planar Er- and Yb-doped amplifiers and lasers," Com Technical University of Denmark, 10th European Conf. on Integrated Optics, Session WeB2, pp. 71-74 (2001).
Hwang et al., "Characterization of sputter-deposited LiMn2O4 thin films for rechargeable microbatteries," 141(12) J. Electrochem. Soc. 3296-99 (1994).
Hwang, M-S. et al., "The effect of pulsed magnetron sputtering on the properties of iridium tin oxide thin films," Surface and Coatings Tech. 171: 29-33 (2003).
Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).
Im, J.S. et al., "Single-crystal Si films for thin-film transistor devices," Appl. Physics Lett. 70(25): 3434-3436 (1997).
Itoh, M. et al., "Large reduction of singlemode-fibre coupling loss in 1.5% L'l planar lightwave circuits using spot-size .mnverters," Electronics Letters 38(2): 72-74 (2002).
Jackson, M.K. and Movassaghi, M., "An accurate compact EFA model," Eur. Conf. Optical Comm., Munich, Germany, 2 pages (2000).
Janssen, R. et al., "Photoinduced electron transfer from conjugated polymers onto nanocrystalline TiO2," Synthet. Metal., 1 page (1999).
Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).
Jones et al., "A Thin Film Solid State Microbattery" 53-56 Solid State Ionics 628 (1992).
Jonsson, L.B. et al., "Frequency response in pulsed DC reactive sputtering processes," Thin Solid Films 365: 43-48 (2000).
Kato, K. and Inoue, Y., "Recent progress on PLC hybrid integration," SPIE 3631: 28-36 (1999).
Kato, K. and Tohmori, Y., "Plc hybrid integration technology and its application to photonic components," IEEE J. Selected Topics in Quantum Electronics 6(1): 4-13 (2000).
Kelly, P.J. and Amell, R.D., "Control of the structure and properties of aluminum oxide coatings deposited by pulsed magnetron sputtering," J. Vac. Sci. Technol. A 17(3): 945-953 (1999).
Kelly, P.J. et al., "A novel technique for the deposition of aluminum-doped zinc oxide films," Thin Solid Films 426(1-2): 111-116 (2003).
Kelly, P.J. et al., "Reactive pulsed magnetron sputtering process for alumina films," J. Vac. Sd. Technol. A 18(6): 2890-2896 (2000).
Kik, P.G. and Polman, A., "Gain limiting processes in Er-doped Si nanocrystal waveguides in Si02," J. Appl. Phys. 91 (1): 536-536 (2002).
Kim et al., "Correlation Between the Microstructures and the Cycling Performance of Ru02 Electrodes for Thin-Film Microsupercapacitros," J. Vac. Sci. Technol. B20(5): 1827-1832 (Sep. 2002).
Kim, D-W. et al. "Mixture Behavior and Microwave Dielectric Properties in the Low-fired TiO2—CuO System," Jpn. J. Appl. Phys. 39:2696-2700 (2000).
Kim, H-K. et al., "Characteristics of rapid-thermal-annealed LiCoO2 cathode film for an all-solid-state thin film microbattery," J. Vac. Sd. Technol. A 22(4): 1182-1187 (2004).
Kim J-Y. et al. "Frequency-dependent pulsed direct current magnetron sputtering of titanium oxide films," J. Vac. Sd. Technol. A 19(2):429-434 (2001).
Ladouceur, F. and Love, J.D., in: Silica-based Buried Channel Waveguides and Devices, Chapman & Hall, London, Table of Contents, 6 pages ( 1996).
Ladouceur, F. et al., "Effect of side wall roughness in buried channel waveguides," IEEE Proc. Optoelectron. 141 (4):242-248 (1994).
Lamb, W. and Zeiler, R., Designing Non-Foil Containing Skins for Vacuum Insulation Panel (VIP) Application, Vuoto XXVIII(I-2):55-58 (1999).
Lamb, W.B., "Designing Nonfoil Containing Skins for VIP Applications," DuPont VIA Symposium Presentation, 35 Pages (1999).
Lange, M.R. et al, "High Gain Ultra-Short Length Phosphate glass Erbium-Doped Fiber Amplifier Material," OSA Optical Fiber Communications (OFC), 3 Pages (2002).
Laporta, P. et al, "Diode-pumped cw bulk Er: Yb: glass laser," Optics Letters 16(24): 1952-1954 (1991).
Laurent-Lund, C. et al., "Pecvd Grown Multiple Core Planar Waveguides with Extremely Low Interface Reflections and Losses," IEEE Photonics Tech. Lett. 10(10):1431-1433 (1998).
Lee, B.H. et al., "Effects of interfacial layer growth on the electrical characteristics of thin titanium oxide films on silion," Appl. Phys. Lett. 74(21):3143-3145 (1999).
Lee, K.K. et al., "Effect of size and roughness on light transmission in a Si/Si02 waveguide: Experiments and model," Apll. Phys. Lett. 77(11): 1617-1619 (2000).

(56) References Cited

OTHER PUBLICATIONS

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Mattox "Handbook of Physical Vapor Deposition (PVD) Processing, Society of Vacuum Coaters," Albuquerque, New Vlexico 660f and 692ff, Noyes Publications (1998).

Meijerink, A. et al, "Luminescence of Ag+ in Crystalline and Glassy Srb407," J. Physics Chem. Solids 54(8):901-906 (1993).

Mesnaoui, M. et al, "Spectroscopic properties of Ag+ ions in phosphate glasses of NaP03—AgP03 system," Eur. J. Solid State Inorg. Chem. 29:1001-1013 (1992).

Mitomi, 0. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Neudecker, B. et al., "Li9SiA108 : a lithium ion electrolyte for voltages above 5.4 V," 143(7) J. Electrochem. Soc. 2198-203 (1996).

Ohkubo, H. et al., Polarization-Insensitive Arrayed-Waveguide Grating Using Pure Si02 Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohno, H. et al., "Electrical conductivity of a sintered pellet of octalithium zirconate," 132 J. Nucl. Mat. 222-30 (1985).

Ohtsuki, T., et al., "Gain Characteristics of high concentration Er'+-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar Er _H_doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex (Ti407) as Electrode Materials," Thin Solid Films 258: 5-9 (1995).

Peters, D.P. et al., Formation mechanism of silver nanocrystals made by ion inadlation of Na+.

Rajarajan, M. et al., "Numerical Study of Spot-Size Expanders fro an Efficient OEIC to SMF Coupling," IEEE Photonics Technology Letters 10(8): 1082-1084 (1998).

\* cited by examiner

Figure 1 – Prior Art

RECHARGEABLE, HIGH-DENSITY ELECTROCHEMICAL DEVICE

RELATED APPLICATIONS

The present application is a continuation of U.S. application Ser. No. 13/154,980 filed on Jun. 6, 2011, which claims priority under 35 U.S.C. § 119(e) to U.S. Provisional Application No. 61/352,082, filed Jun. 7, 2010, each of which is incorporated herein by reference in its entirety.

TECHNICAL FIELD

This invention relates to rechargeable, high-density electrochemical devices. In particular, certain embodiments of the present invention relate to, for example, all-solid state, rechargeable batteries with high energy densities that have the capacity to store more energy in a limited volume and still show acceptable power or current rate capability without any liquid or gel-type battery components.

BACKGROUND OF THE INVENTION

The capacity of rechargeable and non-rechargeable batteries is defined by the positive cathode and the negative anode. When using a metallic lithium anode (e.g. in Li—$MnO_2$ coin cells) or a capacity rich Li-ion anode that, for example, may be based on silicon or tin, the capacity of the battery is dominated or limited by the specific capacity (measured in mAh/g or mAh/ccm) of the positive cathode. Reducing the volume of all of the other battery components, which is most useful for small batteries, or the mass of all of the other battery components, which is most useful for large batteries (e.g. in electric vehicles), while simultaneously increasing the electrochemically active mass inside the positive cathode is the most effective approach to increase the energy density (measured in Wh/liter, for example) of a battery for a given cathode-anode chemistry.

Increasing the electrochemically active mass inside the positive cathode means to either reduce any auxiliary phases inside the cathode, such as mechanical binders or ionic or electronic conduction enhancers, or fabricate the cathode thicker for a given cathode area. Due to the limiting diffusion kinetics and the associated limited current rate or power capability when the cathode thickness becomes substantial (>>20 μm), high energy density room temperature batteries, such as cell phone and laptop batteries, require a highly conductive, liquid-organic-solvent based lithium ion electrolyte to penetrate the cathodes of these batteries. However, the presence of the liquid organic solvent is the origin of most problems experienced with such batteries over the last twenty years such as, for instance, thermal runaway upon decomposition or short-circuiting of the battery upon heat-related failure, fire/fume/smoke/explosion upon certain battery failure modes, gas evolution and pressure build-up in the early electrochemical cycles, charge-discharge cycle limitation to 300-1000 cycles, limited operational temperature range (0° C.-60° C. in many cases), among others. In addition, constraining the volatile liquid organic solvent demands specific packaging architectures and cell housing often equipped with vents and valves that avoid cell over-pressurization during the early electrochemical cycles.

There is a need in the industry for batteries with higher energy densities. In particular, there is a need for all-solid-state rechargeable batteries without any liquid or gel-type battery components to store more energy in a limited volume that still show acceptable power and/or current rate capability. This results in a safer battery and allows for the use of simplified packaging and higher and lower temperature ranges of operation and storage.

SUMMARY OF INVENTION

Certain exemplary embodiments of this invention may include batteries with high energy density for a given cathode-anode chemistry. Certain embodiments, as discussed in further detail below, may involve, for example, low volume or mass of all of the battery components other than the cathode, while simultaneously achieving high electrochemically active mass inside the positive cathode.

An embodiment of a rechargeable electrochemical device with a positive composite cathode may include a solid-state electrochemically active material, a solid-state electronically conducting material which has an electronic conductivity that is at least three times higher than the electronic conductivity of said electrochemically active material before the electrochemically active material is initially charged, and a solid-state, inorganic, ionically conducting material which has an ionic conductivity that is at least three times higher than the ionic conductivity of said electrochemically active material before the electrochemically active material is initially charged.

Alternatively, an embodiment of a rechargeable electrochemical device with a positive composite cathode may include at least one solid-state electrochemically active material, at least one solid-state, ionically conducting material that is different from the electrochemically active material, and may not contain liquid or gel-like solvent.

An alternative embodiment of a rechargeable electrochemical device may include a solid state positive cathode, a negative anode, and a solid state electrolyte sandwiched between the cathode and the anode; wherein the electrochemical device contains a single electrochemical cell which has a rated capacity preferably of, for example, at least 2 mAh/$cm^2$ based on the geometric footprint of the positive cathode.

DETAILED DESCRIPTION OF PREFERRED EMBODIMENTS

Figure 1:
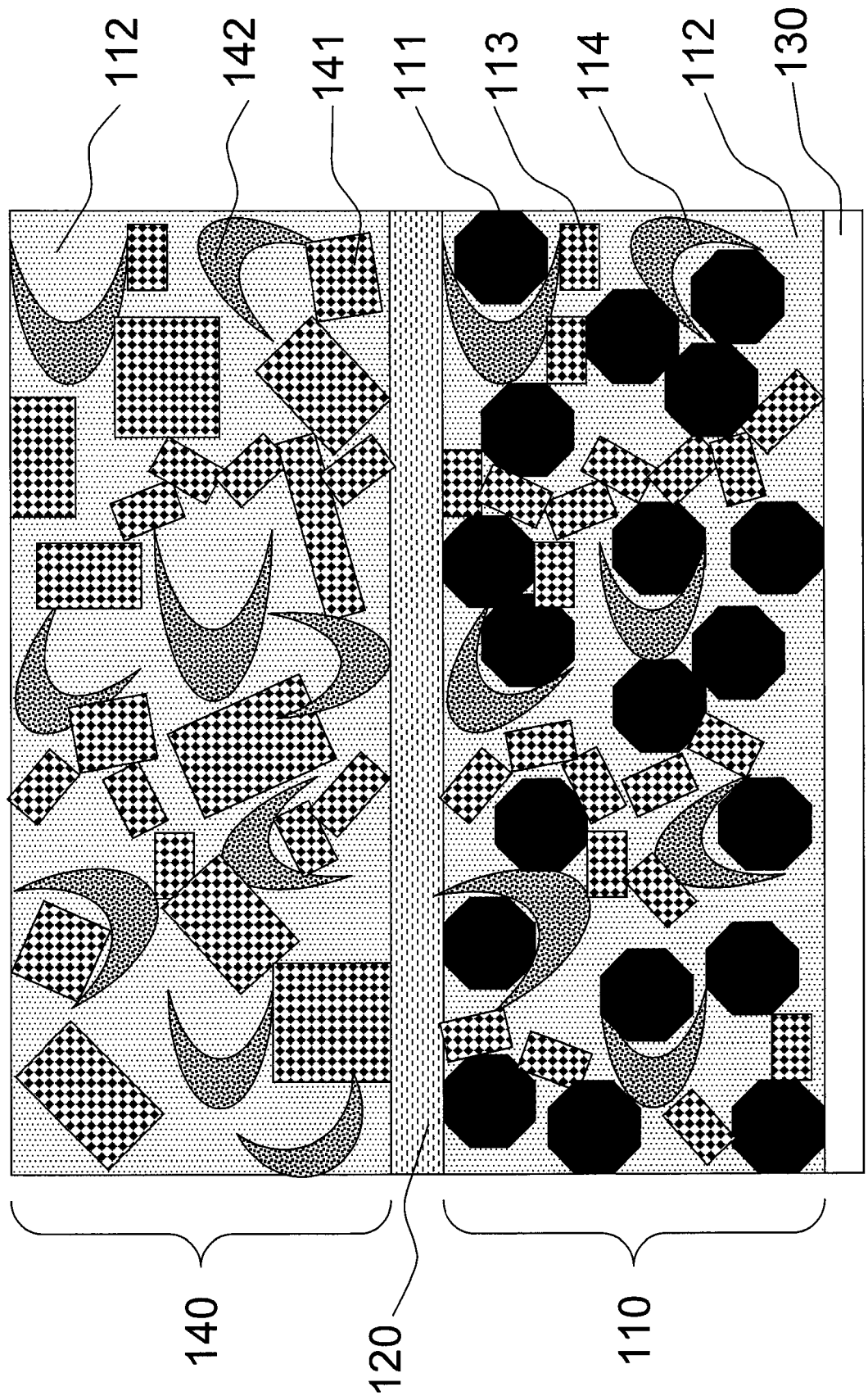
FIG. 1 illustrates a cross-sectional view of an exemplary Li-ion or Li-polymer battery that could be used in a cell phone.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention. Structures described herein are to be understood also to refer to functional equivalents of such structures.

All patents and other publications are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate such disclosure by virtue of prior invention or for any other reason.

Certain embodiments of the present invention, for example, include an all-solid state, high energy density battery cell that does not contain any liquid or gel-like components, unlike traditional cell phone batteries and coin cells. Gel-like components consist of, for example, solvents that have viscosities so high they do not flow like a common liquid. The high energy density may be accomplished through a combination of features, such as, for example:

1. maximizing the cathode thickness per unit cathode area while keeping the charge and discharge current capability within acceptable performance limits;
2. optimizing the loading or volume percentage of the electrochemically active mass inside the cathode, which may include a composite rather than a single phase of electrochemically active material to make up 100% of the cathode volume;
3. utilizing a composite electrochemically active material which contains all-solid state lithium ion conduction and electron conduction enhancing phases; and/or
4. minimizing the volume fraction of all of the other battery cell components, such as the substrate, electrolyte, negative anode, current collectors and terminals and the packaging.

Regarding item 1, certain embodiments of the present invention, for example, may include an electrochemical device with a cathode thickness of about 100-1000 μm, whereas the cathode thickness of cell phone type batteries may be, for example, approximately 100 μm. Regarding item 2, an example electrochemical device may preferably use a loading of the electrochemically active material of higher than about 50 vol %. To enhance the power and current rate capability of the cell (items 1 and 3), the remaining, for instance, 50 vol % of the composite cathode may be filled with two materials: (a) a lithium ion conduction enhancing material, which is chemically stable with the electrochemically active cathode material during fabrication and battery operation and storage while showing an ionic conductivity that is at least three times higher than that of the electrochemically active material; and (b) an electron conduction enhancing material which has an electronic conductivity that is at least three times higher than that of the electrochemically active material. Regarding item 4, the device of certain embodiments of the present invention may be configured, among other parts, with: (i) a thin metal cathode current collector, such as, for instance, 10 μm Al foil, which also serves as an optional substrate (or no such current collector if the positive cathode is conductive enough along its outside surface to which the positive terminal may be connected); (ii) a thin-film electrolyte, such as, for instance, 1-3 μm thick Lipon; and (iii) a thin metal anode, such as, for instance, 10-50 μm of metallic lithium. One or more elements of item 4 may be fabricated into the device of certain embodiments of the present invention by physical vapor deposition (PVD) processing or heat-pressure lamination using readily available Li foil. Finally, the device of certain embodiments of the present invention may be, for example, packaged using a thin-film encapsulation of about 3 μm in thickness, as previously disclosed, for example, in U.S. Pat. Appl. Pub. No. 2009/0181303, which is incorporated herein by reference in its entirety.

In certain embodiments, the absence of any volatile liquid organic solvents inside the composite cathode and/or the electrolyte can be highly conducive to improved safety and higher temperature limits for operation and storage of the electrochemical device, which include lead-free solder reflow conditions during which temperature excursions of up to 265° C. may occur for several minutes.

Lower cost versions of a high-capacity cell of certain embodiments of the present invention may include electrolyte alternatives comprising a thicker ceramic layer, or multi-layers, that are entirely or partially fabricated by non-PVD or non-chemical vapor deposition (CVD) methods, such as traditional ceramic or wet chemical processing. Examples of these electrolyte alternatives may include compacted $Li_2S$—$SiS_2$ or $Li_2S$—$P_2S_5$ based glass electrolyte powder (~100 μm layer thickness), $Li_3N$—$LiTi_2(PO_4)_3$ dual layer ceramic plate (~100 μm thickness), single-sided Lipon protected $LiAl_2Ti(PO_4)_3$ or $Li_{0.35}La_{0.55}TiO_3$ plates (~100 μm thickness) or compacted (pressed) $Li_7La_3Zr_2O_{12}$ powder (~50 μm thickness). Analogous to the composite cathode, a composite anode may be used for certain embodiments of the present invention and may include ceramic compacted, $Li_ySn$-activated, nano-sized $Li_4Ti_5O_{12}$ powder (1.5V vs. $Li^+/Li$; results include 1.5V voltage reduction of the fully fabricated electrochemical cell of certain embodiments of the present invention when compared to those 4V cells that employ a metal lithium anode) wherein $Li_ySn$ serves as a lithium ion and electron conduction enhancing second phase in the volume un-changing $Li_xTi_5O_{12}$ ($4 \leq x \leq 7$) anode phase. Other composite anodes may also be employed.

Although the fabrication of solid state, high capacity cells with ceramic and/or wet chemistry fabricated electrolytes and/or anodes may be attractive because of their cost and manufacturing throughput, they do not include the power and energy density performance of the cells according to certain embodiments of the present invention that use a thin-film electrolyte and a metal anode consisting entirely of the electrochemically active species of the cell (such as metallic lithium for Li-ion batteries). These lower cost batteries are less desirable because the ceramic and/or wet chemistry fabricated electrolyte and/or composite anode are typically thicker (which may increase cell resistance and add non-energy containing volume to cell, both of which are undesirable characteristics) and provide lower cell voltages (which may cause lower energy and lower power, both of which are undesirable characteristics).

Good cathode performance for certain embodiments of the present invention (for both pure cathodes and composite cathodes) may require, for example, a high, effective diffusion coefficient inside the cathode. Such a diffusion coefficient inside the cathode allows for, upon cell discharge, as many electrochemically active species (ions and electrons) as possible to be inserted into the cathode in the shortest time possible and into cathode locations that are farthest away from the diffusion originating plane, which is the cathode-electrolyte interface. In a simplified picture, one may use the one-dimensional solution of Fick's second law of diffusion wherein for a given diffusion coefficient, D, a wave-front of diffusing species penetrates a body after a diffusion period t by depth X (sometimes called diffusion length) according to $$X = 2(D*t)^{1/2} \quad (1)$$

Equation (1) is an accurate estimate for the combined diffusion of ions and electrons. In many practical electrochemically active cathode materials, the electronic conductivity is much higher than that of the electrochemically active ions. For example, the electronic conductivity in charged $Li_xCoO_2$ (x<0.7) is about 1 S/cm at ambient temperatures while that of the lithium ions is less than $10^{-7}$ S/cm. Therefore, it may be beneficial to enhance the lithium ion conductivity of the cathode by admixing appropriate lithium ion conduction enhancing materials, thereby forming a cathode composite.

In certain embodiments, using the ionic conductivity as the determining, independent variable for equation (1), the diffusion coefficient D may be replaced by part of Fick's law of diffusion, which is $$D = RT/(c*z*F^2*dE/dx)*j \quad (2)$$

that relates D to the gas constant R, the absolute temperature T, the local concentration of diffusing species c, the charge number z of these species (z=1 for $Li^+$ ions), the Faraday constant F, the local electric field strength dE/dx, and the current density j of the diffusing species. The resulting equation after inserting equation (2) into equation (1) and squaring both sides of the resulting equation is $$X^2 = 4*RT/(c*z*F^2*dE/dx)*t*j \quad (3)$$

wherein the diffusion period t could also be interpreted as the continuous discharge or charge time that it takes at a given current density j to discharge or charge the rated capacity of a cathode wherein the rated capacity is proportional to the thickness X of the cathode for a given cathode composition of electrochemically active cathode material, ionic conductivity enhancing material and electronic conductivity enhancing material. The rated capacity of a cathode is, for example, the discharge capacity of a battery supplied at ambient conditions following a full battery charge. The resulting equation after converting the current density j into the conductivity G using Ohm's law with resistance R and voltage E across the entire cathode, which in turn has the cross-sectional diffusion area A, $$R = E/(j*A) \quad (4)$$

and the definition for the conductivity G (=inverse resistivity)

$$G = 1/R*X/A \quad (5)$$

is $$j = E*G/X \quad (6)$$

The resulting equation after inserting equation (6) into equation (2) and considering the voltage drop across the entire thickness X of the cathode is $$X^2 = 4*RT/(c*z*F^2*dE/dX)*t*E*G/X \quad (7)$$

or, after rearranging equation (7), $$X^3 = 4*RT/(c*z*F^2*dE/dX)*t*E*G \quad (8)$$

For a constant electric field gradient throughout the cathode, which may be the case for electronically well conducting cathodes, dE/dx becomes E/X such that equation (8) simplifies to $$X^2 = 4*RT/(c*z*F^2)*t*G \quad (9)$$

Therefore, $$X^2 \sim t*G \quad (10)$$

Equation (10) may be considered a design rule for cathodes if, for example, for a given diffusion period (or discharge or charge time) t through thickness X of an electrochemical cell, the ionic conductivity G of the cathode may be increased four-fold before one may afford to double the thickness X of the cathode in order to double its capacity per footprint under otherwise constant parameters (i.e., the same electrochemically active material, same volumetric loading of electrochemically active material, same cross-sectional area of the cathode, among others). The discharge time capability of batteries may be given its reciprocal value, the so-called C-rate, which defines how often a battery or electrochemical cell is able to mathematically discharge its rated capacity in one hour when mathematically neglecting the charge periods in between discharges.

Equation (10) also represents that for a given conductivity G inside the cathode, increasing the cathode thickness can cause a much slower (i.e., longer) discharge time capability (lower C-rate). For example, the discharge time for full discharge of a given rated capacity may increase approximately four-fold (C-rate drops to about 25%) when doubling the thickness of the cathode. Maintaining a given rated capacity while doubling the cathode thickness implies that the thickness increase can be accomplished either by adding electrochemical inert material to the cathode, doubling its porosity or changing the electro-active material inside the cathode.

Equation (10) further teaches that adding electrochemically inert material to the cathode, such as mere ionic or electronic conductivity enhancers that do not store electrochemical capacity or energy and therefore merely increase the thickness of the cathode by $\Delta X$ without increasing the capacity or energy of the cathode, comes with a price: it therefore may be appropriate in certain embodiments to add the inert material if it may increase the ionic conductivity of the (composite) cathode to $G*(X+\Delta X)^2/X^2$ in order to maintain or, even better, shorten the discharge or charge time because $$(X+\Delta X)^2 \sim t*G[(X+\Delta X)^2/X^2] \quad (11)$$

The importance of, and need for, a great ionic conductivity inside certain embodiments of the cathode is evident. Since the electrochemically active cathode material such as, for instance, commercially available $LiCoO_2$, may not provide a sufficiently high lithium ion conductivity itself (e.g., it may exhibit at ambient temperatures $<10^{-7}$ S/cm throughout its electrochemically active range between 4.2V-2.0V vs. $Li^+/Li$) one may, for instance, fabricate composite cathodes with lithium ion conductivity enhancing materials which have a lithium ion conductivity that is substantially higher than that of the electrochemically active cathode material.

After the selection of appropriate lithium ion conduction enhancing material, such as, for example, lithium lanthanum titanate ($Li_{0.35}La_{0.55}TiO_3$ has $G=10^{-3}$ S/cm (bulk) and $G=2*10^{-5}$ S/cm (grain boundary) at 25° C., an example of which is discussed in Y. Inaguma et al., Solid State Communications 86 (1993) p. 689, which is incorporated herein by reference in its entirety), lithium lanthanum zirconate ($Li_7La_3Zr_2O_{12}$ exhibits $7.7*10^{-4}$ S/cm at 25° C., an example of which is discussed in R. Murugan et al., Angewandte Chemie International Edition 46 (2007) 7778, which is incorporated herein by reference in its entirety), lithium aluminum titanium, phosphate ($Li_{1.3}Ti_{1.7}Al_{0.3}(PO_4)_3$ shows $7*10^{-4}$ S/cm at 25° C., an example of which is discussed in G. Adachi et. al, U.S. Pat. No. 4,985,317, which is incorporated herein by reference in its entirety), or lithium thio-phosphate (80 at % $Li_2S$-20 at % $P_2S_5[=Li_8P_2S_9$; "Thio-LISICON II"] shows $7.4*10^{-4}$ S/cm at 25° C., an example of which is discussed in Senga Minoru et. al, U.S. Pat. Appl. Publ. No. 2007/0160911, which is incorporated herein by reference in its entirety), it is important in certain circumstances to ensure that the morphology, which comprises particle size and particle size distribution, of the lithium ion conductivity enhancing material is tuned to the particle size and distribution of the electrochemically active cathode material inside the composite cathode. This approach may provide a positive three-dimensional network of lithium ion conductivity inside said composite cathode. Porosity within the composite cathode may offset the effectiveness of materials with great conductivity (applies to ions and electrons) due to poor conduction paths or inter-grain contact area, which in turn may be maximized for optimum conduction between the grains and throughout the composite cathode. This objective may be well accomplished with particle sizes preferably in the range of approximately 0.1-10 μm, and most preferably 0.5-5 μm, for both the ionic conductivity enhancing material and the electrochemically active material within the cathode. Much larger particles than 10 μm may entail the risk of shadowing or interrupting the ionic conduction path in the ionic network and also the electron conduction path in the electronic network.

Alternatively or additionally, the ionic conductivity of the electrochemically active material itself may be enhanced. This may be achieved by, for example, doping its bulk grain (intra-grain) portion with other, appropriate chemical elements and/or by chemically or mechanically modifying its grain boundaries, which may be the premier ionic conduction gateways between the grains inside a solid state cathode. Chemical modification via reaction with appropriate chemicals may be a preferred method according to certain embodiments of the present invention. Fast ionic grain boundary conduction is most effective in providing ions to and from the locations of the electrochemical reactions responsible for capacity and energy storage, which are inside the grain bulk. If the so-enhanced electrochemically active material in grain bulk and/or grain boundary, for example $LiCoO_2$, inside the cathode shows a sufficiently high lithium ion conductivity, then the addition of an inert phase that merely provides enhanced lithium ion conductivity, such as, for instance, lithium lanthanum titanate ($Li_{0.35}La_{0.55}TiO_3$), may become unnecessary. However, it may be important to ensure that the cathode is electronically conducting well, for example with an electronic conductivity that is much higher than the lithium ion conductivity inside the cathode. Otherwise, the electronic conductivity of the cathode may limit the effectiveness of the lithium ion conductivity, and thus the lithium diffusion through the cathode may occur only at the pace of the limiting electronic conductivity, according to equation (9) when applying to electrons instead of ions.

Electron conductivity enhancing materials are relatively inexpensive such as, for example, carbon or nickel powder. These materials are fairly stable up to at least 500° C. with commonly used electrochemically active materials (e.g., $LiCoO_2$) and selected ionic conductivity enhancing materials, such as, for example, lithium lanthanum titanate ($Li_{0.35}La_{0.55}TiO_3$) or lithium lanthanum zirconate ($Li_7La_3Zr_2O_{12}$). It is preferred according to certain embodiments of the present invention to have these electronic conductivity enhancing materials available in an appropriate particle size distribution that is conducive to maximizing the electronic conductivity of the composite cathode, most preferably at the lowest admixed volume fraction of electron conductivity enhancing material. If one used larger particles, such as, for example, 50 μm Ni, then these particles may provide the composite cathode with a good electronic conductivity but may unnecessarily remove valuable volume inside the composite cathode that may not be filled with the more important electrochemically active cathode material (which provides energy) and/or the optional lithium ion conductivity enhancing material (may enhance the power capability at that energy level).

Alternatively or additionally, the electronic conductivity of the electrochemically active material itself may be enhanced. This may be achieved by, for example, doping its bulk grain (intra-grain) portion with other, appropriate chemical elements and/or by chemically or mechanically modifying its grain boundaries, which may be the premier electronic conduction gateways between the grains inside a solid state cathode. Chemical modification via reaction with appropriate chemicals may be a preferred method according to certain embodiments of the present invention. Fast electronic grain boundary conduction is most effective in providing electrons to and from the locations of the electrochemical reactions responsible for capacity and energy storage, which are inside the grain bulk. If the so-enhanced electrochemically active material in grain bulk and/or grain boundary, for example $LiCoO_2$, inside the cathode shows a sufficiently high electronic conductivity, then the addition of an inert phase that merely provides enhanced electronic conductivity without supplying substantial electrochemical storage capacity in the positive cathode, such as, for instance, nickel or carbon powder, may become unnecessary.

Appropriate particle sizes and distribution may be generated using, for example, high energy ball milling that may grind raw powders down to nano/sub-micron sized particles. Specific particle size distribution of a given material could be accomplished by mixing separately ground powder batches for which different grinding parameters were applied. Since the so-obtained powder of one material (e.g., the lithium ion conductivity enhancing material) has a specific particle size distribution, this powder may be mixed with another material (e.g., the electrochemically active cathode material) that has a particle size distribution that has been created in a similar fashion. Finally, the electron conductivity enhancing material (specific particle size distribution made in a similar manner as employed for the lithium ion conductivity enhancing material) may be added to the powder mix. Then, homogenizing the powder mix may be achieved in various ways, such as, for example, by low-energy ball milling using low concentrations of low-density grinding media such as $Si_3N_4$ or $Al_2O_3$, which may or may not further change the particle size distribution of one or more materials within the powder mixture.

EXAMPLE EMBODIMENTS OF THE PRESENT INVENTION

Example 1

According to an embodiment of the present invention, a commercially available $LiCoO_2$ powder may be used to determine its electronic conductivity at ambient conditions prior to its initial charge by (a) cold pressing 7 tons of a 0.5 mm thick and 10 mm in diameter powder pellet, which may achieve 76% of the theoretical density of 5.06 g/ccm and (b) by cold pressing 7 tons of 0.5 mm thick and 10 mm in diameter powder pellet followed by sintering the pellet at 900° C. for 1 h in air, which may achieve 72% of the theoretical density of 5.06 g/ccm. The so-obtained pellets may then be coated with 0.3 μm thick, PVD fabricated, lithium ion blocking gold electrodes on both pellet faces and subjected to electronic resistance measurements using electrochemical impedance spectroscopy and 10 mV of amplitude. The electronic conductivity of an exemplary cold pressed $LiCoO_2$ pellet obtained $2.7*10^{-5}$ S/cm while the pellet that may be annealed at 900° C. exhibited an electronic conductivity of $7.1*10^{-4}$ S/cm.

Example 2

According to an embodiment of the present invention, the electronic conductivity of a commercially available Ni powder (2-3 μm grain size) may be determined from a cold pressed a 7 ton Ni pellet that was 0.5 mm thick and 10 mm in dia. The density may be 80% of the theoretical density (8.91 g/ccm). The so-obtained Ni pellet may be sandwiched between two copper electrodes and subjected to 10 mVDC. However, the electronic resistance may be so low (<<1 Ohm) that the currents fall outside the capability of the test equipment (10A). Instead of determining the exact electronic conductivity, the electronic conductivity may be approximated by the literature value for Ni, which at 25° C. is about $10^5$ S/cm. This value is more than 10 orders of magnitude greater than that of $LiCoO_2$ prior to the initial charge.

Example 3

According to an embodiment of the present invention, the commercially available $LiCoO_2$ powder from Example 1 may be used to determine its ionic conductivity at ambient conditions prior to its initial charge by (a) cold pressing 7 tons of a 0.5 mm thick and 10 mm in diameter powder pellet and by (b) cold pressing 7 tons of a 0.5 mm thick and 10 mm in diameter powder pellet followed by sintering of the pellet at 700° C. for 1 h in air, which may achieve 73% of the theoretical density of 5.06 g/ccm. The so-obtained pellets may be coated with a 3 μm thick electron blocking Lipon electrolyte layer on each pellet face. In addition, two metallic Li electrodes may be PVD fabricated onto the Lipon electrolyte layers opposite to the sandwiched $LiCoO_2$ pellet. This ionic conductivity test cell may be subjected to ohmic resistance measurements by applying various voltages between 1-5 VDC to the lithium electrodes whereupon lithium plating or stripping may occur. In this setup, only lithium ions may conduct through the $LiCoO_2$ pellet while its electronic conduction was completely arrested. The resulting, instant currents may show ohmic behavior and were calculated into resistances. Subtracting the known, combined resistances of the two 3 μm Lipon layers connected in series (from other separate experiments) enabled the extraction of the ionic conductivity of $LiCoO_2$ prior to its initial charge. The ionic conductivity of both an exemplary cold pressed $LiCoO_2$ pellet and the cold pressed $LiCoO_2$ pellet that was subsequently annealed at 700° C. for 1 h in air was $2*10^{-8}$ S/cm when measured at 25° C., which is more than three orders of magnitude lower than the electronic conductivity of $LiCoO_2$ at 25° C. Therefore, $LiCoO_2$ in this example demonstrates a predominantly electronically conducting material with a poor lithium ion conductivity.

Example 4

According to an embodiment of the present invention, $Li_{0.35}La_{0.55}TiO_3$ may be synthesized by standard powder reaction from the starting compounds LiOH, $La_2O_3$, and $TiO_2$. The final powder, $Li_{0.35}La_{0.55}TiO_3$, may be virtually free of impurity phases as verified by XRD. This powder may then be (a) cold pressed a 7 ton, 0.4 mm thick and 10 mm diameter powder pellet, which achieved 64% of the theoretical density of 4.99 g/ccm, and (b) cold pressed a 7 ton, 0.4 mm thick and 10 mm diameter powder pellet and subsequently sintered at 1100° C. for 1 h in air, which may achieve 70% of the theoretical density of 4.99 g/ccm. The so-obtained pellets may be applied with a PVD fabricated gold electrode on each pellet face. The ionic conductivity of the $Li_{0.35}La_{0.55}TiO_3$ pellets may be determined by electrochemical impedance spectroscopy that can reveal a grain boundary (inter-grain) conductivity of $5.6*10^{-8}$ S/cm measured at 25° C. for the cold pressed pellet while the bulk (intra-grain) conductivity may not be determined due the limited frequency capability of the test setup, which in turn may require frequencies of about 10 MHz range. The grain boundary conductivity of $Li_{0.35}La_{0.35}TiO_3$ pellets annealed at 700° C. for 1 h in air was determined to about $1.8*10^{-7}$ S/cm when measured at 25° C. The 1100° C. fabricated pellet, however, may allow the deconvolution into bulk (inter-grain) and grain boundary (intra-grain) conductivity, which can amount to $5.6*10^{-4}$ S/cm and $2.4*10^{-6}$ S/cm, respectively. These conductivities may be more than two orders of magnitude larger than the lithium ion conductivity of $LiCoO_2$ prior to its initial charge (see Example 3).

Example 5

According to an embodiment of the present invention, a composite cathode may be fabricated with, for example, a mixture of 80 wt % $LiCoO_2$ and 20 wt % Ni without the addition of an ionic conduction enhancer such as $Li_{0.35}La_{0.55}TiO_3$. The mixture may be cold pressed into a composite cathode pellet of the dimensions 0.3 mm×10 mm in diameter Other pellets may be further treated by sintering the pellets at 700° C. for 1 h in air. The resulting cold pressed or sintered composite cathode pellets may remain electronically well conducting ($>10^{-2}$ S/cm). When fabricated into full electrochemical cells comprising 1.5 μm thick Lipon electrolyte and a 10 μm metal Li anode, both pellet types may be found to suffer from severe current rate limitations as early as during the initial charge step at a constant voltage of 4.2V. At 25° C. the current may decay to about 1 μA within minutes, which may cause charge times of more than 10,000 h (more than 1 year) in the case of a 10 mAh cell. Such a cell, for example, may contain 83 mg of $LiCoO_2$. The mere composition of electrochemically active cathode material ($LiCoO_2$), which exhibits ionic and electronic conductivities sufficient, for example, for small cathode thicknesses, such as, for example, less than 30 μm, which are routinely built in thin-film form in certain embodiments of the present invention. Furthermore, electronic conduction enhancer (Ni) may not lead to electrochemically well active composite cathodes when used in substantial thicknesses (>>30 μm) for high capacity cells (>1 mAh/cm$^2$). Therefore, at least one critical component may be missing from the composite cathode to attain useful battery performance.

Example 6

This example demonstrates an exemplary potential improvement over Example 5. According to an embodiment of the present invention, the powders used from Examples 1-4 may be mixed in the following weight percentage ratio: 40 wt % LiCoO$_2$ (theoretical density=5.06 g/ccm), 40 wt % Li$_{0.35}$La$_{0.55}$TiO$_3$ (theoretical density=4.99 g/ccm), and 20 wt % Ni (theoretical density=8.91 g/ccm). The powder mixture may be cold pressed into a 0.3 mm×10 mm in diameter composite cathode pellet of 80% of the theoretical density, which may be calculated from equation (12):

Theoretical density of composite cathode pellet
(g/ccm)=100%/(40 wt %/5.06 g/ccm+40 wt %/4.99 g/ccm+20 wt %/8.91 g/ccm)=5.50 g/ccm  (12)

The electronic conductivity of an exemplary composite cathode pellet using two sandwiching copper plates was greater than 10$^{-2}$ S/cm while no new phases were detected by XRD other than the starting constituents LiCoO$_2$, Li$_{0.35}$La$_{0.55}$TiO$_3$, and Ni. The ionic conductivity of the composite cathode may be estimated from the volume fraction of the Li$_{0.35}$La$_{0.55}$TiO$_3$ within the composite cathode, which is given by equation (13):

vol % of Li$_{0.35}$La$_{0.55}$TiO$_3$=40 wt %*5.50 g/ccm/4.99 g/ccm=44 vol %  (13)

In a first approximation it may be assumed that pellet the following approximation holds true inside the composite cathode:

Density of composite cathode/actual density of Li$_{0.35}$La$_{0.55}$TiO$_3$≈theoretical density of composite cathode/theoretical density of Li$_{0.35}$La$_{0.55}$TiO$_3$  (14)

so that equation (13) provides a good estimate for the actual vol % of Li$_{0.35}$La$_{0.55}$TiO$_3$ inside the composite cathode. It may be further assumed that the lithium ion conductivity for an ideal grain size composition inside the composite cathode may be determined by the vol % of the dominant lithium ion conductor according to Actual vol % Li$_{0.35}$La$_{0.55}$TiO$_3$*5.6*10$^{-8}$ S/cm=2.5*10$^{-8}$ S/cm  (15)

This lithium ion conductivity, example, based on the lithium ion grain boundary conductivity of Li$_{0.35}$La$_{0.55}$TiO$_3$ when cold pressed into a composite cathode pellet and not further heat treated, may be too low for practical purposes and may be similar to lithium ion conductivity of pure LiCoO$_2$ (see Example 3). Therefore, the composite cathode pellet may be heat treated at 700° C. at which the composite cathode may be provided with 0.44*1.8*10$^{-7}$ S/cm=7.9*10$^{-8}$ S/cm. This may still not be enough lithium ionic conductivity for practical applications (see Example 14). Annealing the composite cathode pellet at 900° C. may cause some reaction of LiCoO$_2$ with Ni to form NiO and LiCoO$_2$ decomposition side phases. The improvement in lithium ion conductivity may be minor and/or may rise to about 4*10$^{-7}$ S/cm.

It may be evident that the lithium ionic grain boundary conductivity of the enhancer material can be improved when inside the composite cathode. The composite cathode may, for example, not be processed above a certain temperature (e.g., 900° C.) before undesirable chemical reactions can set in between the constituents of the composite cathode.

These certain exemplary improvements may be accomplished by grinding and milling the powder of the lithium ion conductivity enhancer to smaller grain sizes (<2 μm) and/or by appropriately modifying its grain surfaces, mechanically or chemically, to increase its lithium ion grain boundary conductivity. This so-surface-modified lithium ion conductivity enhancer material may exhibit a grain boundary conductivity of about 10$^{-4}$ S/cm when cold pressed into composite cathode pellets and followed by an anneal step at 700° C. for 1 h in air. An overall lithium ion conductivity of an exemplary composite cathode of about 10$^{-4}$ S/cm may permit continuous current draws of C/30, which translates into 0.2 mA for 6 mAh cells, which may have a 300 μm thick composite cathode (see Example 13).

Example 7

According to an embodiment of the present invention, a 10 mm diameter electrochemical cell providing 2 mAh/cm$^2$ capacity based on the geometric footprint of the positive cathode may be fabricated with a composite cathode consisting of 40 wt % LiCoO$_2$ (theoretical density=5.06 g/ccm), 40 wt % Li$_{0.35}$La$_{0.55}$TiO$_3$ (theoretical density=4.99 g/ccm), and 20 wt % Ni (theoretical density=8.91 g/ccm). The geometric footprint of a cathode is, for example, the surface area that one obtains when looking onto a surface along its surface normal or along the main axis of a device which has a geometric area that is measured while assuming a perfectly smooth surface. With this loading of the electrochemical active cathode material (LiCoO$_2$) the composite cathode can be fabricated with 11.2 mg LiCoO$_2$ thereby leading to a thickness, preferably of about 28 mg/(0.785 cm$^2$*80%*5.50 g/ccm)=81 μm.

Example 8

According to an embodiment of the present invention, a 10 mm diameter electrochemical cell providing 2 mAh/cm$^2$ capacity may be fabricated with a composite cathode consisting of 20 wt % LiCoO$_2$ (theoretical density=5.06 g/ccm), 60 wt % Li$_{0.35}$La$_{0.55}$TiO$_3$ (theoretical density=4.99 g/ccm), and 20 wt % Ni (theoretical density=8.91 g/ccm). With this loading of the electrochemical active cathode material (LiCoO$_2$), the composite cathode can be fabricated with 11.2 mg LiCoO$_2$, thereby leading to a thickness of about 56 mg/(0.785 cm$^2$*80%*5.49 g/ccm)=162 μm.

Example 9

According to an embodiment of the present invention, a 10 mm diameter electrochemical cell providing 4 mAh/cm$^2$ capacity may be fabricated with a composite cathode consisting of 40 wt % LiCoO$_2$ (theoretical density=5.06 g/ccm), 40 wt % Li$_{0.35}$La$_{0.55}$TiO$_3$ (theoretical density=4.99 g/ccm), and 20 wt % Ni (theoretical density=8.91 g/ccm). With this loading of the electrochemical active cathode material (LiCoO$_2$), the composite cathode can be fabricated with 22.4 mg LiCoO$_2$, thereby leading to a thickness of about 56 mg/(0.785 cm$^2$*80%*5.50 g/ccm)=162 μm.

Example 10

According to an embodiment of the present invention, a 10 mm diameter electrochemical cell providing 4 mAh/cm$^2$ capacity may be fabricated with a composite cathode consisting of 20 wt % $LiCoO_2$ (theoretical density=5.06 g/ccm), 60 wt % $Li_{0.35}La_{0.55}TiO_3$ (theoretical density=4.99 g/ccm), and 20 wt % Ni (theoretical density=8.91 g/ccm). With this loading of the electrochemical active cathode material ($LiCoO_2$), the composite cathode can be fabricated with 22.4 mg $LiCoO_2$, thereby leading to a thickness of about 112 mg/(0.785 cm²*80%*5.49 g/ccm)=325 µm.

Example 11

According to an embodiment of the present invention, a 10 mm diameter electrochemical cell providing 5 mAh/cm² capacity may be fabricated with a composite cathode consisting of 40 wt % $LiCoO_2$ (theoretical density=5.06 g/ccm), 40 wt/o $Li_{0.35}La_{0.55}TiO_3$ (theoretical density=4.99 g/ccm), and 20 wt % Ni (theoretical density=8.91 g/ccm). With this loading of the electrochemical active cathode material ($LiCoO_2$), the composite cathode can be fabricated with 28 mg $LiCoO_2$, thereby leading to a thickness of about 70 mg/(0.785 cm²*80%*5.50 g/ccm)=203 µm.

Example 12

According to an embodiment of the present invention, a 10 mm diameter electrochemical cell providing 5 mAh/cm² capacity may be fabricated with a composite cathode consisting of 20 wt % $LiCoO_2$ (theoretical density=5.06 g/ccm), 60 wt %/$Li_{0.35}La_{0.55}TiO_3$ (theoretical density=4.99 g/ccm), and 20 wt % Ni (theoretical density=8.91 g/ccm). With this loading of the electrochemical active cathode material ($LiCoO_2$), the composite cathode can be fabricated with 28 mg $LiCoO_2$, thereby leading to a thickness of about 140 mg/(0.785 cm²*80%*5.49 g/ccm)=406 µm.

Example 13

According to an embodiment of the present invention, the cell of Example 11 wherein the 28 mg of $LiCoO_2$ material may be replaced by 28 mg of $Li_{1.2}Ni_{0.175}Co_{0.10}Mn_{0.525}O_2$ (see, e.g., U.S. Pat. Appl. Publ. No. 2010/086853, which is incorporated herein by reference in its entirety), which may improve the capacity of the cell by 70% when cycled between 4.6-2.0V and while concomitantly enhancing the capacity per unit area from 5 mAh/cm² to more than approximately 8.5 mAh/cm². Since the theoretical densities of $LiCoO_2$ and $Li_{1.2}Ni_{0.175}Co_{0.10}Mn_{0.525}O_2$ are similar, the actual densities of the fabricated composite cathode pellets in the cells are also similar, and therefore both composite cathode pellet thicknesses may be approximately 200 µm.

Example 14

According to an embodiment of the present invention, after rearranging equation (9), $$X^2 = 4*RT/(c*z*F^2)*t*G \quad (16)$$

to $$X^2*c*z*F^2/(4*RT) = t*G \quad (17)$$

wherein c=vol % of active cathode loading in composite cathode*concentration of mobile ionic species in the given active cathode material (18)

For the case wherein the active cathode material is $LiCoO_2$, c=vol % of active cathode loading in composite cathode*2.3*10⁻² mol/ccm (100% dense composite cathode assumed), z=1, F=96485 C/mol, R=8.3143 J/(K*mol), T=298 K, and (Thickness of composite cathode)²*vol % active cathode loading in composite cathode*2.2*10⁴ sec/(Ohm*ccm)=discharge time*lithium ion conductivity in composite cathode (19)

In the case of a 5001 µm thick composite cathode with a 40 vol % loading, for example, a 10 hours (36,000 sec) discharge or charge time (C/10 rate) requires a minimum lithium ion conductivity inside the composite cathode of about 6*10⁻⁴ S/cm while a C/30 rate (30 hours discharge time or charge time) demands only about 2*10⁻⁴ S/cm.

Doubling the cathode loading (80 vol % active loading), for example, while maintaining a given capacity allows the composite cathode to be fabricated in about ½ the cathode thickness or 250 µm. As a result, the C/10 rate capability may require only about 3*10⁻⁴ S/cm while the C/30 scenario may only need about 1*10⁻⁴ S/cm.

Because creating composite cathodes with high lithium ion conductivity at, for example, 10⁻⁴ S/cm, is difficult, one option, for a given capacity in a given composite cathode and for a given discharge or charge time at a given temperature, may be to maximize the vol % loading of the active electrochemical material inside the composite cathode while concurrently minimizing the thickness of the composite cathode.

For a given capacity Q in the given composite cathode which has a given ionic conductivity, the discharge or charge time t determines the maximum continuous discharge or charge current according to maximum continuous discharge or charge current=Q/t (20)

Example 15

According to an embodiment of the present invention, a cell similar to the cell in example 7, but in which the $Li_{0.35}La_{0.55}TiO_3$ powder has an average grain size of less than 2 µm, may have an improved grain boundary conductivity in a manner that it enables the cell to be continuously discharged to about 2 mAh/cm² within 10 hours or less within its reversibility range of 4.2-2.0V. Reversibility range is, for example, the commonly accepted voltage range within which a given electrode is "substantially" stable at a given temperature. Higher temperatures may typically reduce reversibility range of electrodes. For example, at 25° C., the reversibility range of $LiCoO_2$ is commonly accepted as 4.2-2.0V vs. Li⁺/Li, which is equivalent to a stoichiometry range from about $Li_{1.0}CoO_2$ (2.0V vs. Li⁺/Li) to about $Li_{0.5}CoO_2$ (4.2V vs. Li⁺/Li).

Example 16

According to an embodiment of the present invention, a cell similar to the cell in example 9, but in which the $Li_{0.35}La_{0.55}TiO_3$ powder has an average grain size of less than 1 µm, may have an improved grain boundary conductivity that enables the cell to be continuously discharged to about 4 mAh/cm² within 10 hours or less within 4.2-2.0V.

Example 17

According to an embodiment of the present invention, a cell similar to the cell in example 11, but in which the $Li_{0.35}La_{0.55}TiO_3$ powder has an average grain size of less than 0.5 μm, which may have an improved grain boundary conductivity that enables the cell to be continuously (and fully) discharged to about 5 mAh/cm$^2$ in 10 hours or less within 4.2-2.0V.

Example 18

According to an embodiment of the present invention, the electrochemical cell of Example 7 may be configured with a 1.5 μm thick Lipon electrolyte, a 10 μm thick metal Li anode, a 10 μm Al cathode current collector foil, a 10 μm Cu anode current collector foil and a polymeric pouch encapsulation of 100 μm wall thickness above and below the electrochemical cell. Such characteristics provide a volumetric capacity density (which is calculated, for example, by dividing the rated capacity by the fully packaged battery volume) of about 59 Ah/liter in a fully packaged state and a volumetric energy density (which is calculated, for example, by dividing the product of rated capacity times the rated voltage by the fully packaged battery volume) of about 236 Wh/liter, after taking into account that the Li anode increases its thickness to a total of about 22 μm and the composite cathode to a total of about 82 μm when the cell is charged to 4.2V. A "fully packaged state", for example, is the state of a battery that includes all of the peripherals inherent to the battery, which includes, for example, current collectors, terminals, primary encapsulation (if the housing is not already included in the encapsulation), and the housing.

Example 19

According to an embodiment of the present invention, the electrochemical cell of Example 9 may be configured with a 1.5 μm thick Lipon electrolyte, a 10 μm thick metal Li anode, a 10 μm Al cathode current collector foil, a 10 μm Cu anode current collector foil, and a polymeric pouch encapsulation of 100 μm wall thickness above and below the electrochemical cell. Such characteristics provide a volumetric capacity density of about 92 Ah/liter in a fully packaged state and a volumetric energy density of about 368 Wh/liter, after taking into account that the Li anode increases its thickness to a total of about 34 μm and the composite cathode to a total of about 163 μm when the cell is charged to 4.2V.

Example 20

According to an embodiment of the present invention, the electrochemical cell of Example 11 may be configured with a 1.5 μm thick Lipon electrolyte, a 10 μm thick metal Li anode, a 10 μm Al cathode current collector foil, a 10 μm Cu anode current collector foil, and a polymeric pouch encapsulation of 100 μm wall thickness above and below the electrochemical cell. Such characteristics provide a volumetric capacity density of about 103 Ah/liter in a fully packaged state and a volumetric energy density of about 412 Wh/liter, after taking into account that the Li anode increases its thickness to a total of about 40 μm and the composite cathode to a total of about 205 μm when the cell is charged to 4.2V.

Example 21

According to an embodiment of the present invention, the energy densities given in Examples 18, 19, and 20 increase to about 354 Wh/liter, about 552 Wh/liter, and about 618 Wh/liter, respectively, when increasing the loading of the electrochemically active cathode material ($LiCoO_2$) in each example from about 40 wt % to about 60 wt % and reducing the lithium conductivity enhancing material ($Li_{0.35}La_{0.55}TiO_3$, which has very similar density as $LiCoO_2$ so that that the thickness of the composite cathode remains virtually the same) from about 40 wt % to about 20 wt %.

Example 22

According to an embodiment of the present invention, a 618 Wh/liter cell from Example 21 contains about 5.89 mAh and may be configured with a 50 μm thick $Li_7La_3Zr_2O_{12}$ electrolyte, a 50 μm thick $Li_x$Sn-activated, a nano-sized $Li_4Ti_5O_{12}$ Li-ion anode, a 10 μm Al cathode current collector foil, a 10 μm Cu anode current collector foil, and polymeric pouch encapsulation of 100 μm wall thickness above and below the electrochemical cell. This configuration provides the cell with a volumetric capacity density of about 135 Ah/liter in a fully packaged state and a volumetric energy density of about 338 Wh/liter, while the anode thickness remains approximately constant at about 50 nm and the composite cathode may reach a total thickness of about 205 μm when the cell is charged to 4.2V. The midpoint voltage, however, may change from 4.0V (Example 21) to about 2.5V.

Example 23

According to an embodiment of the present invention, a composite cathode may be fabricated consisting of a mixture of 60 wt % $LiCoO_2$, 20 wt % Ni, and 20 wt % of chemically surface modified $Li_{0.35}La_{0.55}TiO_3$. The chemical surface modification of $Li_{0.35}La_{0.55}TiO_3$ may be accomplished by separate and prior reaction with $LiIO_4*2H_2O$, Polypyrrole, $Li_3N$, Ni or carbon at temperatures between 250° C.-900° C. The mixture may then be cold pressed into a composite cathode pellet of the dimensions 0.3 mm×10 mm in diameter and subsequently annealed at 250° C.-500° C. for 1 h in air. The resulting annealed composite cathode pellets remains electronically well conducting (>$10^{-2}$ S/cm). When fabricated into full electrochemical cells comprising 1.5 μm thick Lipon electrolyte and a 10 μm metal Li anode, the composite cathode may supply the cell with continuous charge and discharge currents greater than C/30 of between 4.2-2.0V. The chemical surface modification substantially enhances the lithium ion conductivity of the ionic conductivity enhancer material ($Li_{0.35}La_{0.55}TiO_3$) by about three orders of magnitude from a lithium ion grain boundary (intra-grain) conductivity of $10^{-7}$ S/cm to a lithium ion grain boundary conductivity value close to $10^{-4}$ S/cm.

Example 24

According to an embodiment of the present invention, a composite cathode consisting of a mixture of about 80 wt % chemically surface modified $LiCoO_2$ and about 20 wt % Ni without the addition of any ionic conduction enhancer such as $Li_{0.35}La_{0.55}TiO_3$ may be fabricated. The chemical surface modification of $LiCoO_2$ may be accomplished by separate and prior reaction with $LiIO_4*2H_2O$ or Polypyrrole at temperatures between about 250° C.-900° C. The mixture may then be cold pressed into a composite cathode pellet of the dimensions 0.3 mm×10 mm in diameter and subsequently annealed at about 250° C.-500° C. for 1 h in air. The resulting annealed composite cathode pellets may remain electronically well conducting (>$10^{-2}$ S/cm). When fabricated into full electrochemical cells comprising 1.5 μm thick Lipon electrolyte and a 10 μm metal Li anode, these composite cathodes in these cells may sustain continuous charge and discharge currents greater than C/30 of between 4.2-2.0V. It is evident that the chemical surface modification substantially enhances the lithium ion conductivity of the electrochemically active material ($LiCoO_2$) by more than approximately 3 orders of magnitude from about $2*10^{-8}$ S/cm to a value close to about $10^{-4}$ S/cm. This approach allows the fabrication of composite cathodes, which have an ionic conductivity enhancer that may be the electrochemically active material itself, thereby rendering a separately provided ionic conductivity enhancer that has no electrochemical storage capacity (e.g., $Li_{0.35}La_{0.55}TiO_3$) redundant.

Example 25

According to an embodiment of the present invention, a 10 mm diameter electrochemical cell that utilizes the composite cathode from Example 24 may be fabricated. The composite cathode may have an actual cold pressed density of about 4.43 g/ccm, which is about 80% of its theoretical density of about 5.54 g/ccm, and a thickness of about 350 μm. This composite cathode supplies the cell with about 13.7 mAh of capacity. This cell may be further configured with a 1.5 μm thick Lipon electrolyte, a 10 μm thick metal Li anode, a 10 μm Al cathode current collector foil, a 10 μm Cu anode current collector foil and polymeric pouch encapsulation of 100 μm wall thickness above and below the electrochemical cell. This construction provides the cell with a volumetric capacity density of about 254 Ah/liter in a fully packaged state and a volumetric energy density of about 1018 Wh/liter, after taking into account that the Li anode will increase its thickness to a total of about 92 μm and the composite cathode to a total of about 355 μm when the cell is charged to 4.2V. Such an electrochemical cell may have an improved grain boundary conductivity that enables the cell to be continuously (and fully) discharged to about 17 $mAh/cm^2$ in 10 hours or less within 4.2-2.0V.

FIG. 1 shows a prior art cross-sectional view of a Li-ion or Li-polymer battery as used in cell phone batteries. The composite cathode 110 is typically approximately 100 μm thick and composed of four phases, three of which are solid state phases and the fourth of which is a liquid phase. The electrochemically active cathode material 111 may be solid state $LiCoO_2$ (or derivative) powder and the electronic conductivity enhancer 113 can be graphitic carbon. Polymeric binder 114, such as PVDF, binds the previous two solid state phases to the Al foil substrate 130. A non-aqueous liquid electrolyte 112, which is an organic solvent with dissolved lithium salt, is soaked into the pores of the composite cathode 110. Liquid electrolyte 112 has a high lithium ion conductivity of $10^{-2}$-$10^{-3}$ S/cm at 25° C., when 100% of the measurement volume is electrolyte. Liquid electrolyte 112 may reach almost every volume element inside the composite cathode, except for those volume elements that are already taken by the electrochemically active cathode material 111, the electronic conductivity enhancer 113 and, to some extent, the polymeric binder 114. The composite cathode 110 may have an effective overall lithium ion conductivity throughout its bulk of approximately $10^{-3}$-$10^{-4}$ S/cm at 25° C. given that the electrolyte 112 can be present in, for example, only about 30% of the composite cathode volume and additionally may, for example, have torturous pathways to overcome in the pores to unfold its lithium conductivity.

Further shown in FIG. 1 are the non-aqueous liquid electrolyte 112 soaked, perforated polymeric separator 120 (typically 13-50 μm thick) and a typical Li-ion or Li-polymer anode 140. A Li-ion or Li-polymer anode 140 is typically around 100 μm thick and consists of electrochemical anode material 141, usually provided through graphitic carbon, a polymeric binder 142 that is optimized for graphitic carbon, and non-aqueous liquid electrolyte 112. Additional cell components exist, such as the Cu anode current collector foil and cell packaging, but are not included in FIG. 1.

Figure 2:
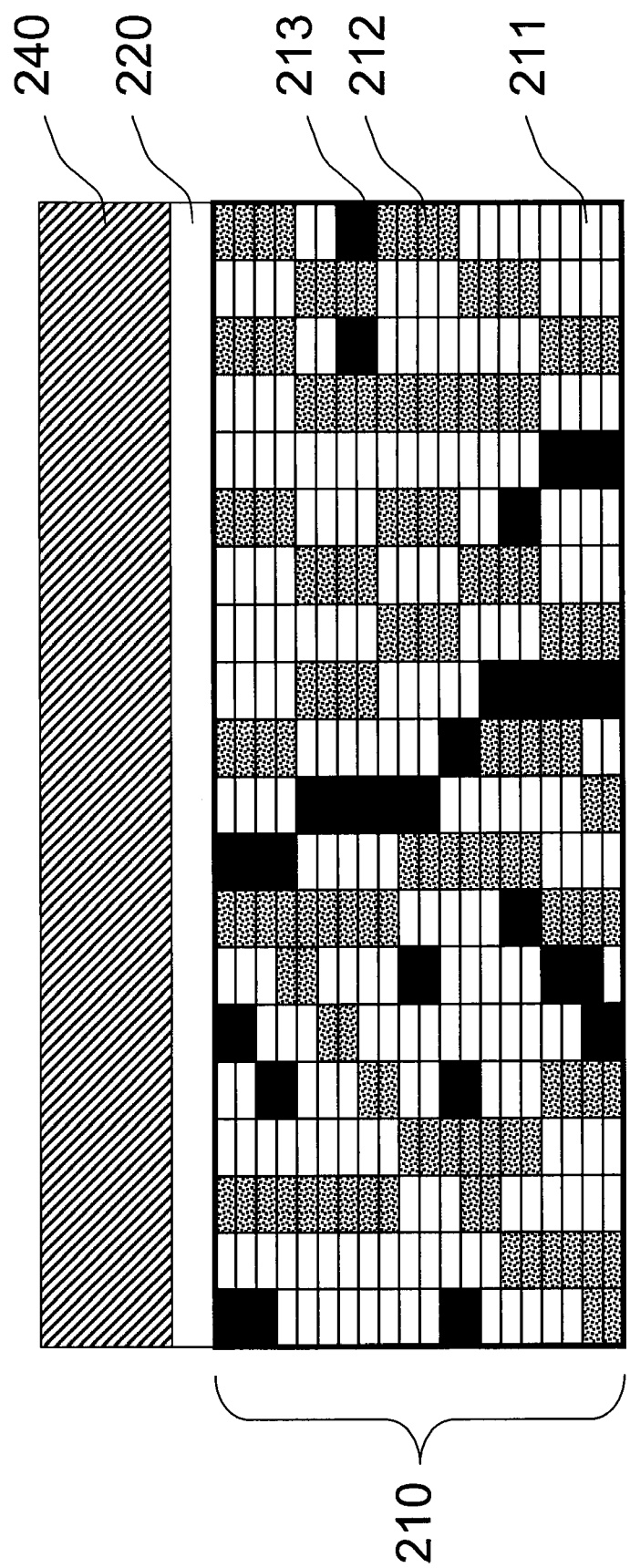
FIG. 2 illustrates an exemplary electrochemical device with three solid phases including an electrochemically active cathode material, an ionic conductivity enhancer and an electronic conductivity enhancer.

FIG. 2 shows one of the exemplary embodiments of the present invention. Composite cathode 210 may be composed of, for example, at least three solid state phases (without any liquid phases present): (1) at least one solid-state electrochemically active cathode material 211 such as, for instance, $LiCoO_2$; (2) at least one solid-state electronically conducting material 213, such as, for instance, Ni, which has an electronic conductivity that may be at least three times higher than the electronic conductivity of said electrochemically active cathode material 211 prior to its initial charge; and (3) at least one solid-state, inorganic, ionically conducting material 212, such as, for instance, $Li_{0.35}La_{0.55}TiO_3$, which may have an ionic conductivity that may be at least three times higher than the ionic conductivity of the electrochemically active cathode material 211 prior to its initial charge.

Composite cathode 210 of certain embodiments of the present invention may not require any pores for a liquid non-aqueous electrolyte and thus may be fabricated in a denser fashion (e.g., typical residual porosity of less than 20%) and annealed at higher temperatures for improved grain boundary bonding. Composite cathode 210 of certain embodiments of the present invention may be easily fabricated with increased thickness (e.g., 100-1000 μm) and good mechanical properties. In certain embodiments of the present invention, composite cathode 210 may have sufficient rigidity so that it is able to serve as its own substrate or substrate for the other cell components, such as, for instance, 1.5 μm thick solid-state thin-film electrolyte 220 and thin-film metallic lithium anode 240.

Figure 3:
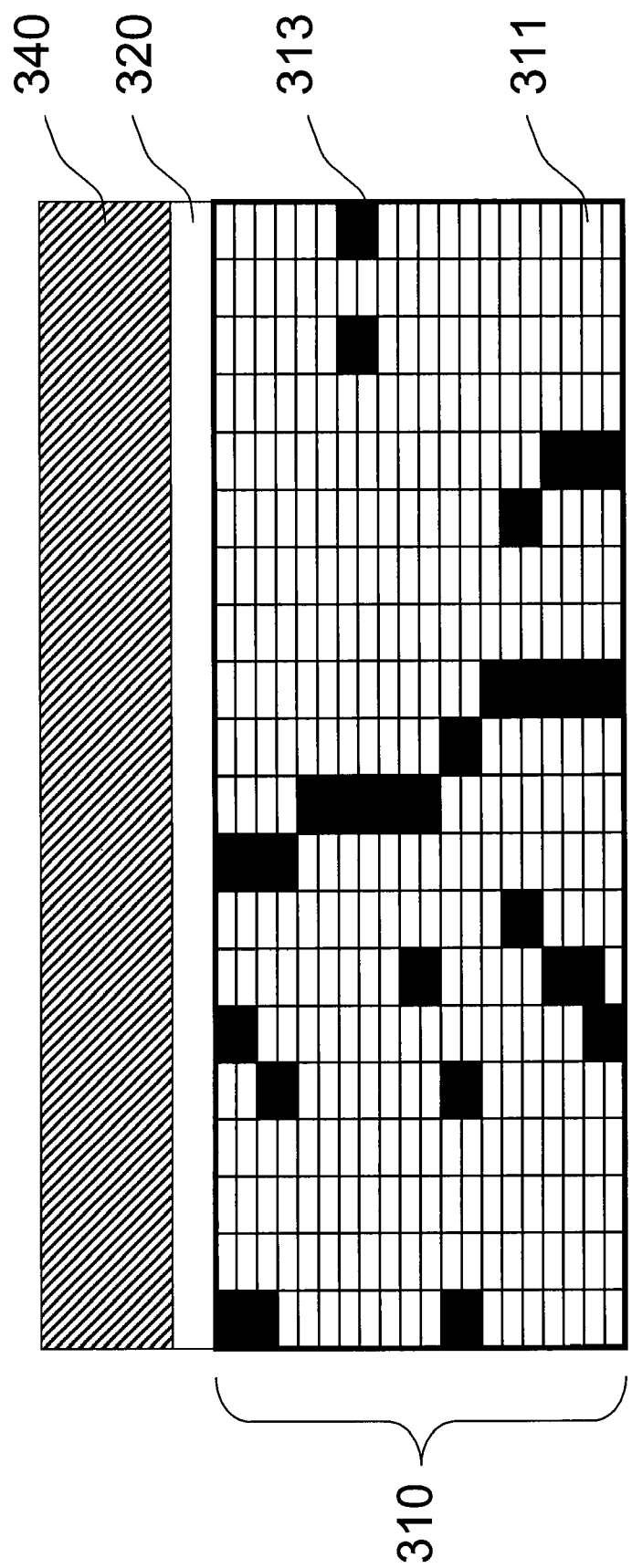
FIG. 3 illustrates an exemplary electrochemical device with two solid phases including an electrochemically active cathode material and an electronic conductivity enhancer.

FIG. 3 shows another alternative preferred embodiment of the present invention. Composite cathode 310 may be composed of at least two solid state phases (without any liquid phases present): (1) at least one solid-state electrochemically active cathode material 311 such as, for instance, surface modified $LiCoO_2$ with strongly enhanced lithium ion grain boundary conductivity; and (2) at least one solid-state electronically conducting material 313, such as, for instance Ni, which has an electronic conductivity that may be at least three times higher than the electronic conductivity of said electrochemically active cathode material 311 prior to its initial charge. The provision of surface modified $LiCoO_2$ with strongly enhanced lithium ion grain boundary conductivity may make obsolete the need for a separate, solid-state, inorganic, ionically conducting material, such as element 212 in FIG. 2.

Composite cathode 310 of certain embodiments of the present invention may not require any pores for a liquid non-aqueous electrolyte and thus may be fabricated in a denser fashion (typical residual porosity of less than 20%) and annealed at higher temperatures for improved grain boundary bonding. Composite cathode 310 of certain embodiments of the present invention may be easily fabricated with increased thickness (e.g., 100-1000 μm) and good mechanical properties. In most cases, composite cathode 310 of certain embodiments of the present invention may have sufficient rigidity so that it is able to serve as its own substrate or substrate for the other cell components, such as, for instance, 1.5 μm thick solid-state thin-film electrolyte 320 and thin-film metallic lithium anode 340.

The embodiments and examples described above are exemplary only. One skilled in the art may recognize variations from the embodiments specifically described here, which are intended to be within the scope of this disclosure and invention. As such, the invention is limited only by the following claims. Thus, it is intended that the present invention cover the modifications of this invention provided they come within the scope of the appended claims and their equivalents.

The invention claimed is:

1. A rechargeable electrochemical device comprising:
a solid-state cathode comprising:
an electrochemically active material having an electronic conductivity and an ionic conductivity, the electrochemically active material having a modified surface with enhanced lithium ion grain boundary conductivity, such that the ionic conductivity of the electrochemically active material with the modified surface is at least three times higher than an ionic conductivity of the electrochemically active material without the modified surface, wherein
the solid-state composite cathode does not include a liquid and does not include a gel, and
the modified surface is a chemically modified surface achieved with reacting the electrochemically active material with a surface modifying chemical.

2. The rechargeable electrochemical device of claim 1, wherein the solid-state cathode further comprises an electronically conducting material having an electronic conductivity at least three times higher than the electronic conductivity of the electrochemically active material in a pre-charged state.

3. The rechargeable electrochemical device of claim 2, wherein the electronically conducting material is nickel.

4. The rechargeable electrochemical device of claim 2, wherein the electrochemically active material is 80 wt. % or greater of the solid-state composite cathode.

5. The rechargeable electrochemical device of claim 1, wherein a particle size of the electrochemically active material is between 0.1-10 μm.

6. The rechargeable electrochemical device of claim 1, wherein the electrochemically active material is surface modified $LiCoO_2$.

7. The rechargeable electrochemical device of claim 1, wherein the electronic conductivity of the electrochemically active material is enhanced by doping a bulk grain portion of the electrochemically active material.

8. The rechargeable electrochemical device of claim 1, further comprising a solid-state electrolyte, which does not comprise a liquid and which does not comprise a gel.

9. The rechargeable electrochemical device of claim 1, wherein the surface modifying chemical is $LiIO_4 \cdot 2H_2O$ or polypyrrole.

10. A rechargeable electrochemical device comprising:
a solid-state composite cathode consisting of:
an electrochemically active material having an electronic conductivity and an ionic conductivity, the electrochemically active material having a modified surface such that the ionic conductivity of the electrochemically active material with the modified surface is at least three times higher than an ionic conductivity of the bulk grain of the electrochemically active material, and
an electronically conducting material having an electronic conductivity at least three times higher than the electronic conductivity of the electrochemically active material in a pre-charged state.

11. The rechargeable electrochemical device of claim 10, wherein the electronically conducting material is nickel and the electrochemically active material is $LiCoO_2$.

12. The rechargeable electrochemical device of claim 10, wherein the modified surface of the electrochemically active material is a mechanically modified surface.

13. The rechargeable electrochemical device of claim 10, wherein the modified surface of the electrochemically active material is a chemically modified surface by reaction of the electrochemically active material with a surface modifying chemical.

14. A rechargeable electrochemical device comprising:
a solid-state composite cathode including:
an electrochemically active material consisting essentially of $LiCoO_2$, the electrochemically active material having an electronic conductivity and an ionic conductivity, the electrochemically active material having a mechanically modified surface having enhanced lithium ion grain boundary conductivity, such that the ionic conductivity of the electrochemically active material with the modified surface is at least three times higher than an ionic conductivity of bulk electrochemically active material without the modified surface, wherein the solid-state composite cathode does not include a liquid and does not include a gel;
a negative anode; and
a solid-state electrolyte sandwiched between the solid state composite cathode and the negative anode.

15. The rechargeable electrochemical device of claim 14, wherein a particle size of the electrochemically active material is between 0.1 μm-10 μm.

16. The rechargeable electrochemical device of claim 14, wherein the solid-state composite cathode further comprises an electronically conducting material having an electronic conductivity at least three times higher than the electronic conductivity of the electrochemically active material in a pre-charged state.

17. The rechargeable electrochemical device of claim 16, wherein the electronically conducting material is nickel.

18. The rechargeable electrochemical device of claim 16, wherein the electrochemically active material is 80 wt. % or greater of the solid-state composite cathode.

19. The rechargeable electrochemical device of claim 16, further comprising a volumetric capacity density of at least 250 Ah/liter in a fully packaged state.

20. The rechargeable electrochemical device of claim 16, further comprising a volumetric energy density of at least 1000 Wh/liter in a fully packaged state.

* * * * *